United States Patent
Dinan

(10) Patent No.: US 10,568,085 B2
(45) Date of Patent: *Feb. 18, 2020

(54) HANDOVER SIGNALING IN WIRELESS NETWORKS

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/912,080

(22) Filed: Mar. 5, 2018

(65) Prior Publication Data
US 2018/0359732 A1    Dec. 13, 2018

Related U.S. Application Data

(63) Continuation of application No. 14/926,816, filed on Oct. 29, 2015, now Pat. No. 9,913,269, which is a continuation of application No. 14/194,754, filed on Mar. 2, 2014, now Pat. No. 9,220,105, which is a continuation of application No. 13/956,640, filed on
(Continued)

(51) Int. Cl.
| | |
|---|---|
| *H04W 72/04* | (2009.01) |
| *H04W 36/00* | (2009.01) |
| *H04W 36/30* | (2009.01) |
| *H04W 36/06* | (2009.01) |
| *H04W 36/12* | (2009.01) |

(Continued)

(52) U.S. Cl.
CPC ....... *H04W 72/042* (2013.01); *H04L 27/2601* (2013.01); *H04W 24/08* (2013.01); *H04W 36/0005* (2013.01); *H04W 36/0072* (2013.01); *H04W 36/0083* (2013.01); *H04W 36/06* (2013.01); *H04W 36/12* (2013.01); *H04W 36/30* (2013.01); *H04W 72/0406* (2013.01); *H04W 72/0446* (2013.01); *H04W 72/0453* (2013.01)

(58) Field of Classification Search
CPC .................................................. H04W 72/042
See application file for complete search history.

(56) References Cited

U.S. PATENT DOCUMENTS

| | | |
|---|---|---|
| 6,711,120 B1 | 3/2004 | Laroia et al. |
| 7,372,813 B1 | 5/2008 | Cimino et al. |

(Continued)

FOREIGN PATENT DOCUMENTS

| | | |
|---|---|---|
| WO | 2010053984 A2 | 5/2010 |
| WO | 2011052643 A1 | 5/2011 |

(Continued)

OTHER PUBLICATIONS

Ericsson: "Control plane aspects of carrier aggregation," 3GPP Draft; R2-092958, RAN WG2, Apr. 28, 2009, San Francisco, USA.

(Continued)

*Primary Examiner* — Albert T Chou
(74) *Attorney, Agent, or Firm* — Banner & Witcoff, Ltd.

(57) ABSTRACT

A base station and a wireless device may communicate with one another regarding carrier types that may differ based on the presence or absence of certain reference signals. The communication may be, for example, related to a handover decision.

48 Claims, 12 Drawing Sheets

Related U.S. Application Data

Aug. 1, 2013, now Pat. No. 8,711,731, which is a continuation of application No. 13/852,634, filed on Mar. 28, 2013, now Pat. No. 8,531,990, which is a continuation of application No. 13/691,722, filed on Nov. 30, 2012, now Pat. No. 8,446,844.

(60) Provisional application No. 61/566,670, filed on Dec. 4, 2011, provisional application No. 61/566,671, filed on Dec. 4, 2011.

(51) Int. Cl.
  *H04L 27/26* (2006.01)
  *H04W 24/08* (2009.01)

(56) References Cited

U.S. PATENT DOCUMENTS

| | | | |
|---|---|---|---|
| 7,924,475 | B2 | 4/2011 | Suzuki |
| 7,924,755 | B2 | 4/2011 | Xu et al. |
| 8,009,760 | B2 | 8/2011 | Ahn et al. |
| 8,019,017 | B2 | 9/2011 | Ahn et al. |
| 8,238,475 | B2 | 8/2012 | Malladi et al. |
| 8,245,092 | B2 | 8/2012 | Kotecha et al. |
| 8,369,280 | B2 | 2/2013 | Dinan |
| 8,422,455 | B1 | 4/2013 | Dinan |
| 8,427,976 | B1 | 4/2013 | Dinan |
| 8,437,303 | B2 | 5/2013 | Dinan |
| 8,446,844 | B1 | 5/2013 | Dinan |
| 8,483,172 | B1 | 7/2013 | Dinan |
| 8,526,393 | B1 | 9/2013 | Dinan |
| 8,526,459 | B2 | 9/2013 | Dinan |
| 8,531,990 | B1 | 9/2013 | Dinan |
| 8,532,684 | B2 | 9/2013 | Chien et al. |
| 8,571,056 | B1 | 10/2013 | Dinan |
| 8,576,794 | B1 | 11/2013 | Dinan |
| 8,582,527 | B2 | 11/2013 | Dinan |
| 8,614,983 | B2 | 12/2013 | Classon et al. |
| 8,626,104 | B2 | 1/2014 | Huang et al. |
| 8,626,218 | B2 | 1/2014 | Wang |
| 8,699,449 | B2 | 4/2014 | Dinan |
| 8,705,461 | B2 | 4/2014 | Bala et al. |
| 8,711,731 | B1 | 4/2014 | Dinan |
| 8,737,315 | B2 | 5/2014 | Shiizaki et al. |
| 8,804,772 | B2 | 8/2014 | Dinan |
| 8,811,333 | B2 | 8/2014 | Dinan |
| 8,842,637 | B2 | 9/2014 | Dinan |
| 8,908,633 | B2 | 12/2014 | Dinan |
| 8,953,550 | B2 | 2/2015 | Dinan |
| 8,989,130 | B2 | 3/2015 | Dinan |
| 9,213,080 | B2 | 12/2015 | Siomina et al. |
| 9,220,105 | B2 | 12/2015 | Dinan |
| 9,247,534 | B2 | 1/2016 | Plan et al. |
| 9,496,995 | B2 | 11/2016 | Kim et al. |
| 9,729,370 | B2 | 8/2017 | Cheng |
| 9,913,269 | B2 * | 3/2018 | Dinan ............... H04W 36/0072 |
| 2004/0097867 | A1 | 5/2004 | Fraser et al. |
| 2005/0117536 | A1 | 6/2005 | Cho et al. |
| 2005/0220000 | A1 | 10/2005 | Kim et al. |
| 2005/0243793 | A1 | 11/2005 | Kim et al. |
| 2008/0112308 | A1 | 5/2008 | Cleveland |
| 2008/0165832 | A1 | 7/2008 | Fukuda et al. |
| 2008/0287068 | A1 | 11/2008 | Etemad |
| 2008/0310540 | A1 | 12/2008 | Tiirola et al. |
| 2008/0316956 | A1 | 12/2008 | Turanyi et al. |
| 2008/0318528 | A1 | 12/2008 | Hooli et al. |
| 2009/0040956 | A1 | 2/2009 | Shinoi |
| 2009/0059844 | A1 | 3/2009 | Ko et al. |
| 2009/0109890 | A1 | 4/2009 | Chow et al. |
| 2009/0180435 | A1 | 7/2009 | Sarkar |
| 2009/0219875 | A1 | 9/2009 | Kwak et al. |
| 2009/0238241 | A1 | 9/2009 | Hooli et al. |
| 2009/0252077 | A1 | 10/2009 | Khandekar et al. |
| 2009/0316656 | A1 | 12/2009 | Zhao et al. |
| 2010/0034163 | A1 | 2/2010 | Damnjanovic et al. |
| 2010/0120442 | A1 | 5/2010 | Zhuang et al. |
| 2010/0135257 | A1 | 6/2010 | Higuchi et al. |
| 2010/0227569 | A1 | 9/2010 | Bala et al. |
| 2010/0272017 | A1 | 10/2010 | Terry et al. |
| 2010/0272066 | A1 | 10/2010 | Wang et al. |
| 2010/0281323 | A1 | 11/2010 | Wang et al. |
| 2010/0316000 | A1 | 12/2010 | Burbidge et al. |
| 2010/0322190 | A1 | 12/2010 | Satou et al. |
| 2010/0323704 | A1 | 12/2010 | Tailor et al. |
| 2011/0026645 | A1 | 2/2011 | Luo et al. |
| 2011/0032839 | A1 | 2/2011 | Chen et al. |
| 2011/0044391 | A1 | 2/2011 | Ji et al. |
| 2011/0064035 | A1 | 3/2011 | Guerreiro et al. |
| 2011/0065435 | A1 | 3/2011 | Pancorbo Marcos et al. |
| 2011/0075624 | A1 | 3/2011 | Papasakellariou et al. |
| 2011/0075640 | A1 | 3/2011 | Mo et al. |
| 2011/0075650 | A1 | 3/2011 | Zhu et al. |
| 2011/0085521 | A1 | 4/2011 | Terry |
| 2011/0085618 | A1 | 4/2011 | Zhuang et al. |
| 2011/0103395 | A1 | 5/2011 | Ratnakar et al. |
| 2011/0116456 | A1 | 5/2011 | Gaal et al. |
| 2011/0141985 | A1 | 6/2011 | Larsson et al. |
| 2011/0149894 | A1 | 6/2011 | Luo et al. |
| 2011/0170489 | A1 | 7/2011 | Han et al. |
| 2011/0170496 | A1 | 7/2011 | Fong et al. |
| 2011/0199926 | A1 | 8/2011 | Zheng et al. |
| 2011/0200139 | A1 | 8/2011 | Jen et al. |
| 2011/0201323 | A1 | 8/2011 | Wu et al. |
| 2011/0216846 | A1 | 9/2011 | Lee et al. |
| 2011/0243090 | A1 | 10/2011 | Grovlen et al. |
| 2011/0249578 | A1 | 10/2011 | Nayeb Nazar et al. |
| 2011/0249633 | A1 | 10/2011 | Hong et al. |
| 2011/0255629 | A1 | 10/2011 | Ko et al. |
| 2011/0261768 | A1 | 10/2011 | Luo |
| 2011/0261897 | A1 | 10/2011 | Jen et al. |
| 2011/0268062 | A1 | 11/2011 | Ji et al. |
| 2011/0268204 | A1 | 11/2011 | Choi et al. |
| 2011/0268207 | A1 | 11/2011 | Choi et al. |
| 2011/0269492 | A1 | 11/2011 | Wang |
| 2011/0274031 | A1 | 11/2011 | Gaal et al. |
| 2011/0274066 | A1 | 11/2011 | Tee et al. |
| 2011/0275359 | A1 | 11/2011 | Sebire et al. |
| 2011/0310823 | A1 | 12/2011 | Nam et al. |
| 2011/0319068 | A1 | 12/2011 | Kim et al. |
| 2011/0319120 | A1 | 12/2011 | Chen et al. |
| 2012/0003945 | A1 | 1/2012 | Liu et al. |
| 2012/0008570 | A1 | 1/2012 | Li et al. |
| 2012/0039180 | A1 | 2/2012 | Kim et al. |
| 2012/0039199 | A1 | 2/2012 | Chen et al. |
| 2012/0039369 | A1 | 2/2012 | Choi et al. |
| 2012/0039402 | A1 | 2/2012 | Clerckx et al. |
| 2012/0044910 | A1 | 2/2012 | Maeda et al. |
| 2012/0045014 | A1 | 2/2012 | Damnjanovic et al. |
| 2012/0051257 | A1 | 3/2012 | Kim et al. |
| 2012/0054258 | A1 | 3/2012 | Li et al. |
| 2012/0063302 | A1 | 3/2012 | Damnjanovic et al. |
| 2012/0087318 | A1 | 4/2012 | Liu et al. |
| 2012/0087424 | A1 | 4/2012 | Brown et al. |
| 2012/0088514 | A1 | 4/2012 | Lee et al. |
| 2012/0099466 | A1 | 4/2012 | Aoyama et al. |
| 2012/0106465 | A1 | 5/2012 | Haghighat et al. |
| 2012/0121031 | A1 | 5/2012 | Tang et al. |
| 2012/0122440 | A1 | 5/2012 | Krishnamurthy et al. |
| 2012/0127938 | A1 | 5/2012 | Lv et al. |
| 2012/0128088 | A1 | 5/2012 | Ko et al. |
| 2012/0140743 | A1 | 6/2012 | Pelletier et al. |
| 2012/0157140 | A1 | 6/2012 | Kim et al. |
| 2012/0163250 | A1 | 6/2012 | Chin et al. |
| 2012/0182879 | A1 | 7/2012 | Tamura et al. |
| 2012/0207099 | A1 | 8/2012 | Lindh et al. |
| 2012/0207126 | A1 | 8/2012 | Qu et al. |
| 2012/0213095 | A1 | 8/2012 | Krishnamurthy et al. |
| 2012/0213096 | A1 | 8/2012 | Krishnamurthy et al. |
| 2012/0213123 | A1 | 8/2012 | Futaki |
| 2012/0213261 | A1 | 8/2012 | Sayana et al. |
| 2012/0218952 | A1 | 8/2012 | Kwon et al. |
| 2012/0236803 | A1 | 9/2012 | Vujcic |
| 2012/0250520 | A1 | 10/2012 | Chen et al. |
| 2012/0270591 | A1 | 10/2012 | Sun et al. |

(56) References Cited

U.S. PATENT DOCUMENTS

| | | |
|---|---|---|
| 2012/0275400 A1 | 11/2012 | Chen et al. |
| 2012/0281556 A1 | 11/2012 | Sayana et al. |
| 2012/0281566 A1 | 11/2012 | Pelletier et al. |
| 2012/0281646 A1 | 11/2012 | Liao et al. |
| 2012/0287865 A1 | 11/2012 | Wu et al. |
| 2012/0300718 A1 | 11/2012 | Ji et al. |
| 2012/0300728 A1 | 11/2012 | Lee et al. |
| 2012/0320846 A1 | 12/2012 | Papasakellariou et al. |
| 2013/0003604 A1 | 1/2013 | Blankenship et al. |
| 2013/0003639 A1 | 1/2013 | Noh et al. |
| 2013/0003663 A1 | 1/2013 | Blankenship et al. |
| 2013/0003672 A1 | 1/2013 | Dinan |
| 2013/0003673 A1 | 1/2013 | Dinan |
| 2013/0010715 A1 | 1/2013 | Dinan |
| 2013/0028236 A1 | 1/2013 | Jung et al. |
| 2013/0034070 A1 | 2/2013 | Seo et al. |
| 2013/0039188 A1 | 2/2013 | Larsson et al. |
| 2013/0039284 A1 | 2/2013 | Marinier et al. |
| 2013/0044693 A1 | 2/2013 | Lindh et al. |
| 2013/0064128 A1 | 3/2013 | Li et al. |
| 2013/0083753 A1 | 4/2013 | Lee et al. |
| 2013/0089078 A1 | 4/2013 | Liu et al. |
| 2013/0094464 A1 | 4/2013 | Li et al. |
| 2013/0100888 A1 | 4/2013 | Shimezawa et al. |
| 2013/0100921 A1 | 4/2013 | Nakao et al. |
| 2013/0107835 A1 | 5/2013 | Aiba et al. |
| 2013/0107861 A1 | 5/2013 | Cheng et al. |
| 2013/0114419 A1 | 5/2013 | Chen et al. |
| 2013/0114425 A1 | 5/2013 | Sayana et al. |
| 2013/0114517 A1 | 5/2013 | Blankenship et al. |
| 2013/0114521 A1 | 5/2013 | Frenne et al. |
| 2013/0114529 A1 | 5/2013 | Chen et al. |
| 2013/0114542 A1 | 5/2013 | Dinan |
| 2013/0121267 A1 | 5/2013 | Koorapaty et al. |
| 2013/0121277 A1 | 5/2013 | To et al. |
| 2013/0128857 A1 | 5/2013 | Nakao |
| 2013/0129018 A1 | 5/2013 | Ko et al. |
| 2013/0136098 A1 | 5/2013 | Li et al. |
| 2013/0142064 A1 | 6/2013 | Dinan |
| 2013/0142141 A1 | 6/2013 | Dinan |
| 2013/0155897 A1 | 6/2013 | Ihm et al. |
| 2013/0155990 A1 | 6/2013 | Nishio et al. |
| 2013/0155996 A1 | 6/2013 | Horiuchi et al. |
| 2013/0156125 A1 | 6/2013 | Ko et al. |
| 2013/0163551 A1 | 6/2013 | He et al. |
| 2013/0176936 A1 | 7/2013 | Takahashi et al. |
| 2013/0176974 A1 | 7/2013 | Dinan |
| 2013/0182627 A1 | 7/2013 | Lee et al. |
| 2013/0182654 A1 | 7/2013 | Hariharan et al. |
| 2013/0195020 A1 | 8/2013 | Frederiksen et al. |
| 2013/0195057 A1 | 8/2013 | Dinan |
| 2013/0195068 A1 | 8/2013 | Baker et al. |
| 2013/0215871 A1 | 8/2013 | Dinan |
| 2013/0223301 A1 | 8/2013 | Lee et al. |
| 2013/0223381 A1 | 8/2013 | Dinan |
| 2013/0230015 A1 | 9/2013 | Hoymann et al. |
| 2013/0235839 A1 | 9/2013 | Kim et al. |
| 2013/0242750 A1 | 9/2013 | Baker et al. |
| 2013/0242777 A1 | 9/2013 | Choi et al. |
| 2013/0242880 A1 | 9/2013 | Miao et al. |
| 2013/0250864 A1 | 9/2013 | Zhang et al. |
| 2013/0250882 A1 | 9/2013 | Dinan |
| 2013/0258987 A1 | 10/2013 | Chun et al. |
| 2013/0279459 A1 | 10/2013 | Lee et al. |
| 2013/0286997 A1 | 10/2013 | Davydov et al. |
| 2013/0294369 A1 | 11/2013 | Dinan |
| 2013/0294385 A1 | 11/2013 | Dinan |
| 2013/0301597 A1 | 11/2013 | Kim et al. |
| 2013/0308576 A1 | 11/2013 | Dinan |
| 2013/0315190 A1 | 11/2013 | Horiuchi et al. |
| 2013/0322382 A1 | 12/2013 | Dinan |
| 2013/0329612 A1 | 12/2013 | Seo et al. |
| 2013/0329686 A1 | 12/2013 | Kim et al. |
| 2014/0003379 A1 | 1/2014 | Kang et al. |
| 2014/0003385 A1 | 1/2014 | Dinan |
| 2014/0029577 A1 | 1/2014 | Dinan |
| 2014/0044084 A1 | 2/2014 | Lee et al. |
| 2014/0050192 A1 | 2/2014 | Kim et al. |
| 2014/0056244 A1 | 2/2014 | Frenne et al. |
| 2014/0064235 A1 | 3/2014 | Seo et al. |
| 2014/0064240 A1 | 3/2014 | Dinan |
| 2014/0071952 A1 | 3/2014 | Kim et al. |
| 2014/0105150 A1 | 4/2014 | Kim et al. |
| 2014/0105155 A1 | 4/2014 | Kim et al. |
| 2014/0105156 A1 | 4/2014 | Jang et al. |
| 2014/0105165 A1 | 4/2014 | Dinan |
| 2014/0112280 A1 | 4/2014 | Lee et al. |
| 2014/0112283 A1 | 4/2014 | Kim et al. |
| 2014/0126487 A1 | 5/2014 | Chen et al. |
| 2014/0126505 A1 | 5/2014 | Chun et al. |
| 2014/0153515 A1 | 6/2014 | Chun et al. |
| 2014/0177577 A1 | 6/2014 | Dinan |
| 2014/0177578 A1 | 6/2014 | Dinan |
| 2014/0177598 A1 | 6/2014 | Dinan |
| 2014/0192759 A1 | 7/2014 | Son et al. |
| 2014/0254410 A1 | 9/2014 | Seo et al. |
| 2014/0254420 A1 | 9/2014 | Kim et al. |
| 2014/0328315 A1 | 11/2014 | Dinan |
| 2015/0003381 A1 | 1/2015 | Dinan |
| 2015/0124754 A1 | 5/2015 | Forster et al. |
| 2015/0131609 A1 | 5/2015 | Dinan |
| 2016/0135156 A1 | 5/2016 | Lee et al. |

FOREIGN PATENT DOCUMENTS

| | | |
|---|---|---|
| WO | 2011085195 A1 | 7/2011 |
| WO | 2013140241 A1 | 9/2013 |
| WO | 2013167967 A2 | 11/2013 |

OTHER PUBLICATIONS

3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
3GPP TSG RAN WG1 #69 R1-122794, May 21-25, 2012, Prague, Czech Republic, Source: Qualcomm Incorporated. Title: Mapping of e-PDCCH in presence of other signals.
3GPP TSG RAN WG1 #68 R1-120267, Dresden, Germany Feb. 6-10, 2012, Source: HTC. Title: Search Space Design for E-PDCCH.
3GPP TSG RAN WG1 #68 R1-120507, Dresden, Germany, Feb. 6-10, 2012, Source: Alcatel-Lucent, Alcatel-Lucent Shanghai Bell. Title: Further details of ePDCCH UE-specific search space design.
3GPP TSG RAN WG1 Meeting #68bis R1-121252, Jeju, Korea, Mar. 26-30, 2012, Source: Alcatel-Lucent Shanghai BEll, Alcatel-Lucent Title: Search Space Design for ePDCCH.
3GPP TSG RAN WG1 Meeting #68bis R1-121354, Jeju, Korea, Mar. 26-30, 2012, Source: Sharp. Title: Common search space in ePDCCH.
3GPP TSG RAN WG1 #68bis R1-121644, Jeju, Korea, Mar. 26-30, 2012, Source: Samsung. Title: Support of Common Search Space Design for E-PDCCHs.
3GPP TSG RAN WG1 Meeting #69, R1-121977, Prague, Czech Republic, May 21-25, 2012, Source: NTT DOCOMO. Title: Views on Resource Mapping for ePDCCH.
3GPP TSG RAN WG1 #69 R1-122000, Prague, Czech Republic, May 21-25, 2012, Source: Ericsson, ST-Ericsson. Title: Mapping of ePDCCH to RE.
Response to European Office Action—EP 14200113.0—dated Jun. 11, 2015.

(56) References Cited

OTHER PUBLICATIONS

3GPP TSG RAN1 #65 R1-111471, Barcelona, Spain, May 9-13, 2011, Source: Samsung, Title: Discussion on Downlink Control Channel Enhancement.
European Search Report—EP 14200113.0—dated Jul. 17, 2015.
Response to EP Office Action—EP App 14200113.0—Filed Feb. 17, 2016.
European Search Report—EP Appl. 15188352.7—dated Aug. 9, 2016.
European Office Action—EP App. 14200113.0—dated Sep. 30, 2016.
Mar. 8, 2018—European Office Action—EP 18157643.0.
Aug. 27, 2019—European Office Action—EP 18157643.0.

* cited by examiner

HANDOVER SIGNALING IN WIRELESS NETWORKS

CROSS-REFERENCE TO RELATED APPLICATIONS

The present application is a continuation of application Ser. No. 14/926,816 filed on Oct. 29, 2015, now U.S. Pat. No. 9,913,269, which is a continuation of application Ser. No. 14/194,754, filed Mar. 2, 2014, now U.S. Pat. No. 9,220,105, which is a continuation of application Ser. No. 13/956,640, filed Aug. 1, 2013, now U.S Pat. No. 8,711,731, which is a continuation of application Ser. No. 13/852,634, filed Mar. 28, 2013, now U.S. Pat. No. 8,531,990, which is a continuation of application Ser. No. 13/691,722, filed Nov. 30, 2012, now U.S. Pat. No. 8,446,844, which claims the benefit of U.S. Provisional Application No. 61/566,670, filed Dec. 4, 2011, which claims the benefit of U.S. Provisional Application No. 61/566,671, filed Dec. 4, 2011.

BACKGROUND OF THE INVENTION

Field of the invention: Example embodiments of the technology disclosed herein may be related to the field of multicarrier communication systems.

FIG. 1 is a diagram depicting example sets of OFDM subcarriers in a multicarrier communication systems. Arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

A multicarrier communication network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. Multicarrier communication networks may handover wireless devices between base stations.

BRIEF SUMMARY OF THE INVENTION

A base station receives a first radio resource control (RRC) message comprising parameter(s) indicating whether a wireless device supports an enhanced physical downlink control channel (ePDCCH). The base station selectively transmits second RRC message(s) configuring first radio resources of a first ePDCCH. The base station makes a handover decision for the wireless device. The base station transmits a third message to a target base station. The third message comprises at least one of: parameter(s) indicating whether the wireless device supports an ePDCCH, and configuration information of the first ePDCCH.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention implement multicarrier OFDM communications. Example embodiments of the technology disclosed herein may be employed in the technical field of multicarrier communication systems. More particularly, the embodiments of the technology disclosed herein may relate to transmission and reception of control and data traffic in a multicarrier OFDM communication system.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
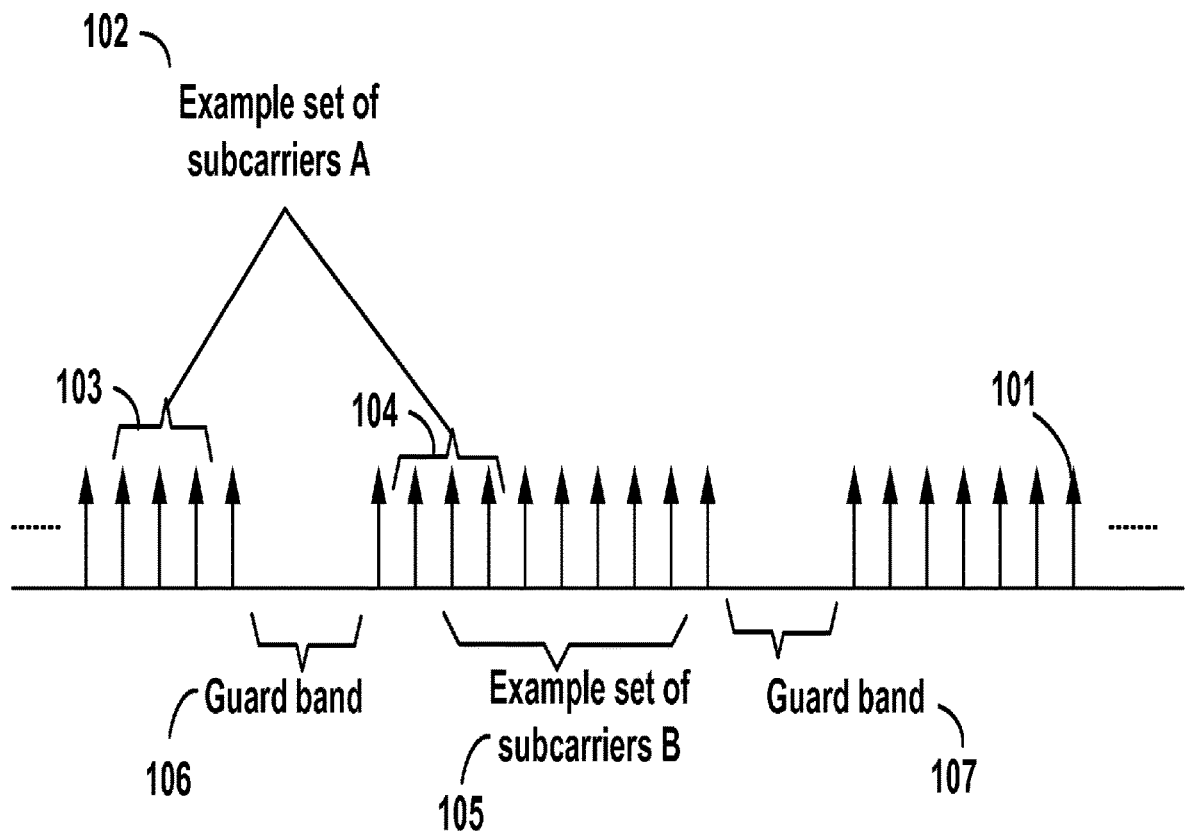
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
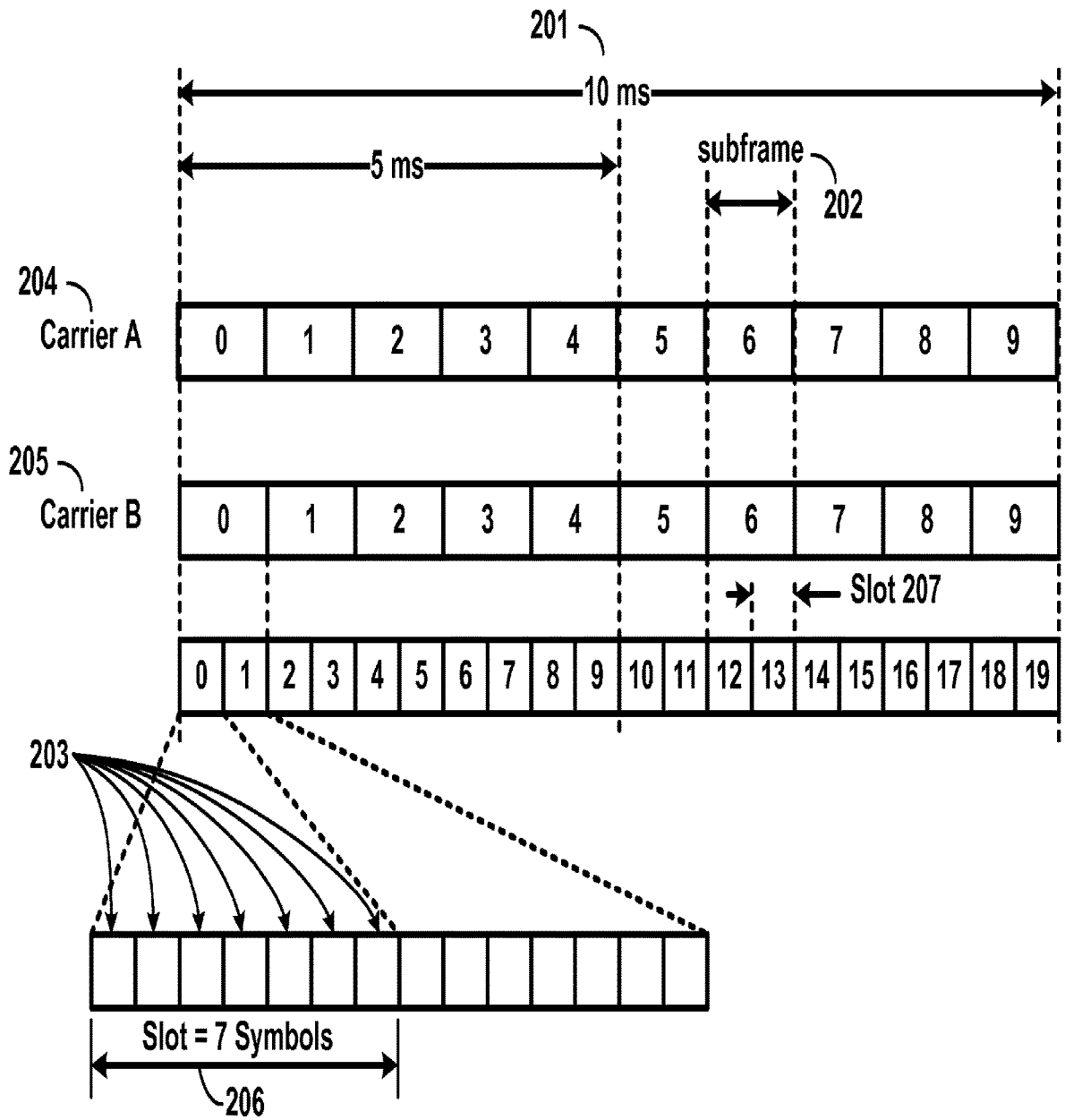
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, a 10 ms radio frame 201 may be divided into ten equally sized subframes 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
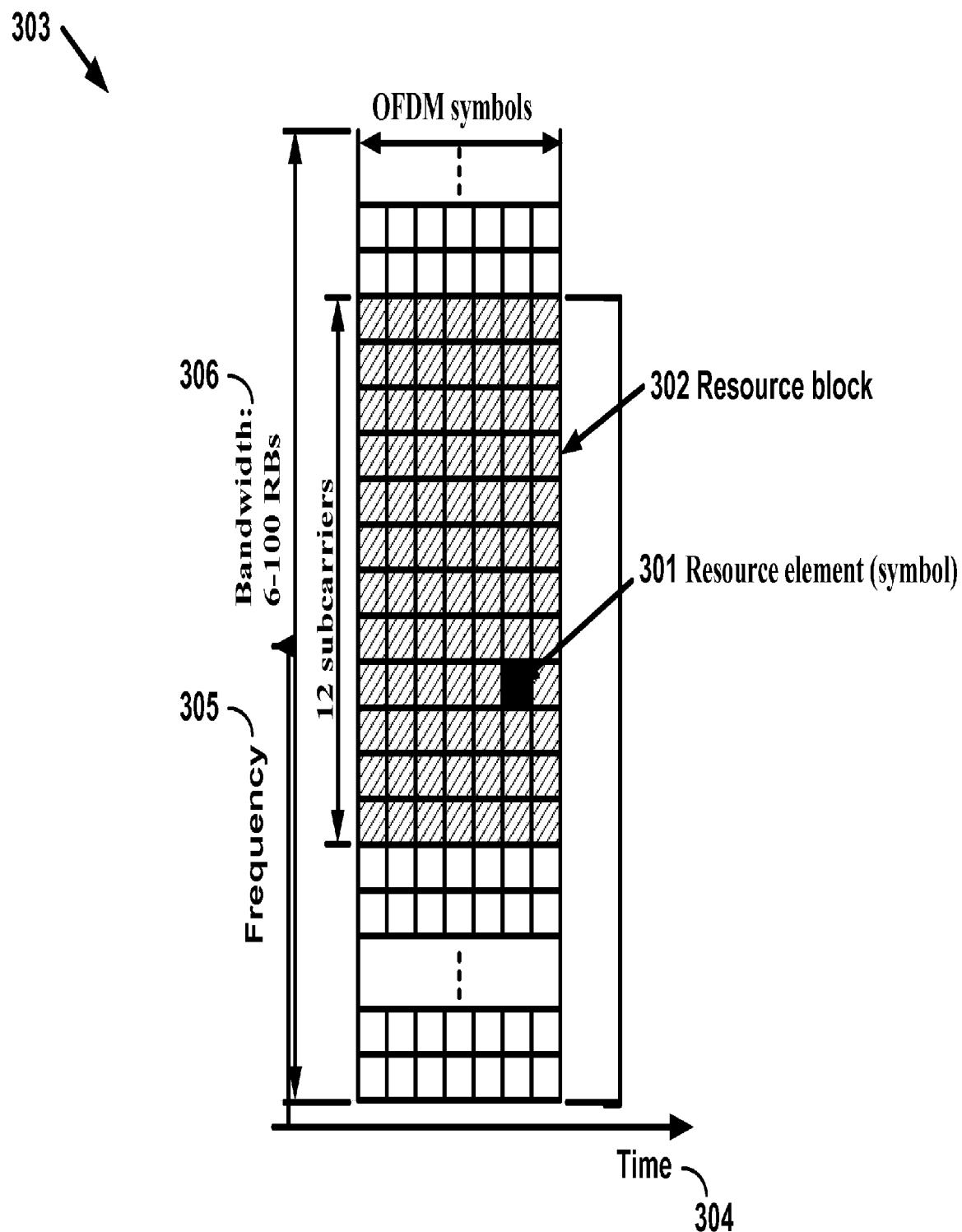
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Figure 4:
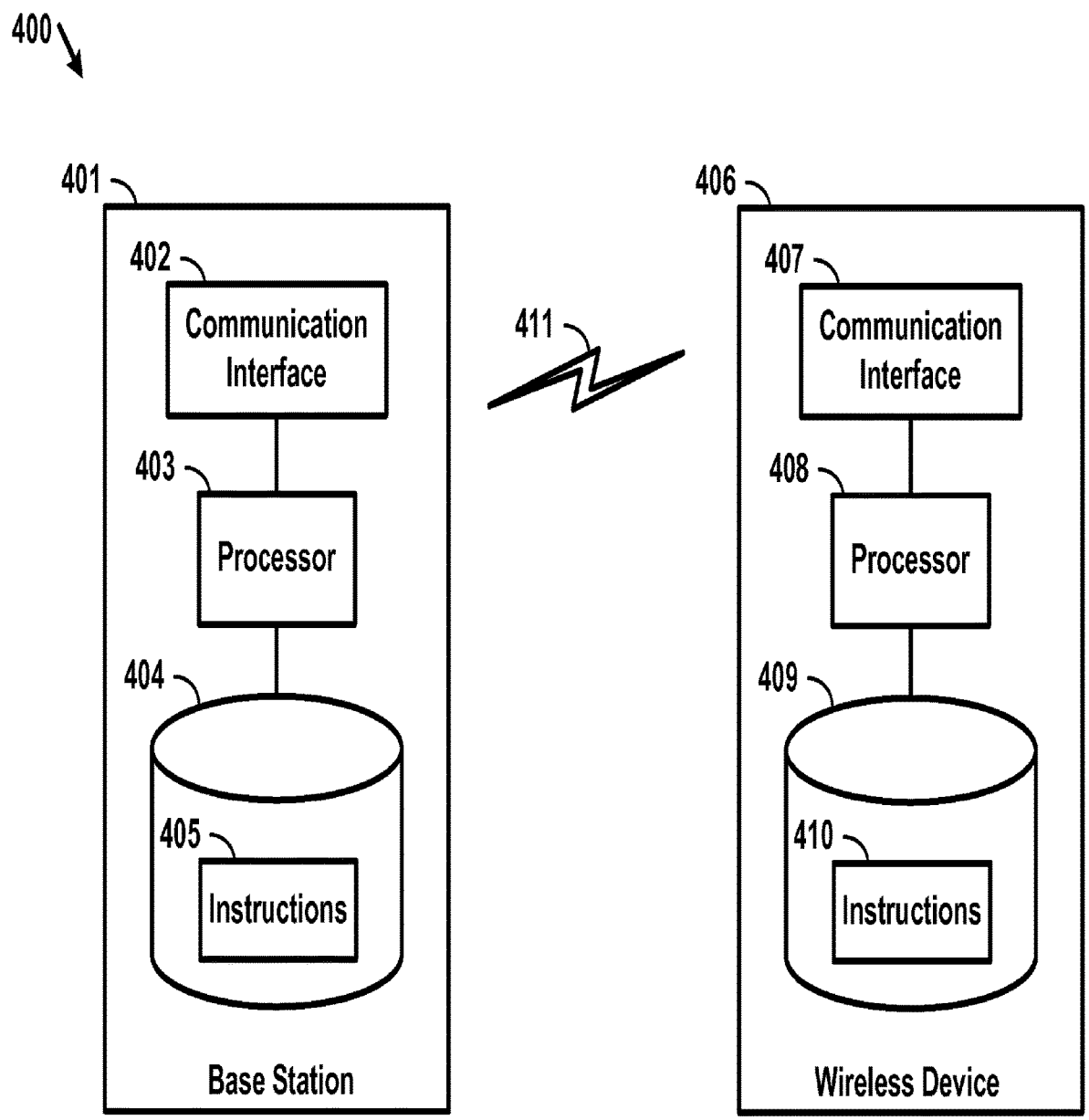
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Some example embodiments for radio technology implemented in communication interface 402, 407 and wireless link 411 are illustrated in FIG. 1, FIG. 2, and FIG. 3. and associated text.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) may belong to one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

In carrier aggregation, two or more carriers may be aggregated in order to support wider transmission bandwidths. A wireless device may simultaneously receive or transmit on one or multiple carriers depending on its capabilities. An LTE Rel-10 or above wireless device with reception and/or transmission capabilities for carrier aggregation may simultaneously receive and/or transmit on multiple carriers corresponding to multiple serving cells. An LTE Rel-8/9 wireless device may receive on a single carrier and transmit on a single carrier corresponding to one serving cell. Carrier aggregation may be supported for both contiguous and non-contiguous carriers. A carrier may comprise a plurality of resource blocks in the frequency domain. A wireless device may be configured to aggregate a different number of carriers originating from the same base station and of possibly different bandwidths in the uplink and the downlink. The number of downlink carriers that may be configured may depend, at least in part, on the downlink aggregation capability of the wireless device. The number of uplink carriers that may be configured may depend, at least in part, on the uplink aggregation capability of the wireless device. A wireless device may not be configured with more uplink carriers than downlink carriers. In typical TDD deployments, the number of carriers and the bandwidth of a carrier in uplink and downlink may be the same. Carriers originating from the same base station may or may not provide the same coverage.

According to the LTE release 10 standard, carriers should be LTE Rel-8/9 compatible. Existing mechanisms (e.g. barring) may be used to avoid Rel-8/9 wireless devices to camp on a given carrier. The backward compatibility of release 10 carriers may introduce additional overhead and reduce air interface spectral efficiency. To overcome this issue, a new carrier type, called non-prime carrier or non-backward compatible carrier in this specification, may be introduced for carrier aggregation to enhance spectral efficiency, improve support for overlapping cells and increase energy efficiency. Non-prime carriers may not include the same radio structure as legacy carriers and may not be backward compatible. Legacy carriers are sometimes referred to prime carriers in this specification. A prime carrier (backward compatible carrier) may be different from a primary carrier as defined in LTE release 10. A prime carrier in this specification may be a legacy carrier, for example, a carrier compatible with LTE release 8, 9, or 10. Prime carriers may comprise primary carriers and secondary carriers as defined in LTE release 10. In this specification, a prime carrier may be a backward compatible carrier and may be a primary carrier or a secondary carrier.

According to some of the various aspects of embodiments, enhanced spectral efficiency may be possible by removing or reducing some legacy control signaling and overhead (for example, PSS, SSS, PBCH, SIB, PCH, PDCCH, and/or the like) and/or common reference signal symbols in the downlink. According to some of the various aspects of embodiments, some of the legacy control signaling overhead may be maintained, for example, PSS/SSS may be transmitted in unsynchronized non-prime carriers. Spectral efficiency in the downlink of non-prime carriers may be improved. An enhanced PDCCH for a non-prime carrier may be adopted instead of legacy PDCCH to improve the spectral efficiency of the downlink control channel. The enhanced PDCCH may also improve network performance in overlapping cells. A non-prime carrier may be implemented without legacy PDCCH. Common reference signal overhead may be removed or reduced. The changes in PDCCH and common reference signal may improve network performance in overlapping cells. According to some of the various aspects of embodiments, a subframe may become empty or include a reduced number of symbols. This may reduce power consumption in the base station. A base station may be configured to: not transmit any signal in a subframe (for example, enter sleep mode or a power saving mode); and/or reduce power consumption when the base station does not transmit any data packet or control packets in that subframe. In prime carriers, a base station may transmit signals in all subframes, even the almost blank subframes. In a non-prime carrier, there may be at least one subframe in which the base station does not transmit any data, control, or reference signals on the non-prime carrier. This mechanism may enhance energy efficiency in a base station.

According to some of the various aspects of embodiments, a non-prime carrier may be associated with a prime carrier (backward compatible carrier). A non-prime carrier may not be configured as a primary carrier and may serve as a secondary carrier. An uplink primary carrier may contain PUCCH radio resources. The uplink non-prime carrier may be configured to operate without PUCCH radio resources. In LTE Rel-10, the primary cell configuration and PUCCH configuration may be wireless device-specific. In legacy LTE uplink carriers (Release 10 and before), resource blocks at the two ends of an uplink carrier may be allocated to PUCCH radio resources. A non-prime carrier may be configured to operate without PUCCH. Resource blocks at the two ends of the uplink carrier may be available for PUSCH transmission. In another example embodiment, a non-prime carrier may be configured to operate without any uplink random access channel resources. Carriers may be grouped in a carrier group. Uplink transmissions in a group may have its own reference timing. A non-prime carrier may be grouped with at least a prime carrier, and the uplink timing of a non-prime carrier may be tied to a prime uplink carrier in the same group. A downlink synchronization signal in a reference cell of the group is employed to synchronize the timing of cells in a cell group. A group may be configured with a group index. Timing groups in a wireless device may be configured employing RRC configuration messages that associate a cell group index to at least one cell identifier/index.

According to some of the various aspects of embodiments, a non-prime carrier may be configured to operate as a synchronous carrier with another carrier. In another example embodiment, a non-prime carrier may operate as an unsynchronized carrier. In synchronized non-prime carriers, the legacy and additional non-prime carriers may be synchronized in time and frequency. A minimum or a reduced synchronization processing may be needed in the receiver. Synchronization is considered from the perspective of the wireless device receiver. In unsynchronized non-prime carriers, the legacy and additional carriers may not be synchronized with the same degree of accuracy as for the synchronized carriers. In unsynchronized non-prime carriers, the associated legacy and additional carriers may operate without being synchronized with the same degree of accuracy as for the synchronized carriers. Wireless devices may need to perform synchronization on unsynchronized non-prime carriers. According to some of the various aspects of embodiments, when a non-prime carrier and the associated prime carrier are in the same band or have adjacent frequencies, the two carriers may be considered as synchronized. In another example embodiment, when a non-prime carrier and the associated prime carrier are in two different bands, the two carriers may be considered as unsynchronized carriers with respect to the wireless device. According to some of the various aspects of embodiments, an LTE network and/or a wireless device may support synchronized non-prime carriers, unsynchronized non-prime carriers, none of them, or both of them. Some wireless devices may be configured to not support any type of non-prime carriers. Some wireless devices may support synchronized non-prime carriers, or unsynchronized non-prime carriers or both. Network overhead and signaling may be implemented differently in synchronized non-prime and unsynchronized non-prime carriers.

According to some of the various aspects of embodiments, a wireless device may need to identify the type of a non-prime carrier before using the non-prime carrier. This may be achieved by higher layer signaling (RRC signaling) or a wireless device may detect a carrier type by itself (for example, by autonomous wireless device detection). According to some of the various aspects of embodiments, a non-prime carrier type may be configured as an unsynchronized non-prime carrier or as a synchronized non-prime carrier. When a base station configures a non-prime carrier for a wireless device, the wireless device may be informed of the carrier synchronization type (synchronized or unsynchronized) by the base station. According to some of the various aspects of embodiments, the wireless device may be informed that a configured non-prime carrier is a synchronized carrier. Information to identify a reference associated carrier for time/frequency tracking of a synchronized carrier may be configured in a wireless device via higher layer signaling (RRC signaling) or may be decided by grouping carriers. According to some of the various aspects of embodiments, a synchronized non-prime carrier may be configured to operate without transmitting PSS/SSS. The wireless device may skip further synchronization on the non-prime carrier and may depend on the associated legacy carrier (prime carrier) timing. In another example embodiment, PSS/SSS may be transmitted in a synchronous non-prime carrier. According to some of the various aspects of embodiments, a wireless device may be informed that a configured non-prime carrier is an unsynchronized carrier. The wireless device may perform synchronization by detecting PSS/SSS and/or common reference signal on the non-prime carrier.

According to some of the various aspects of embodiments, in non-prime carriers, the demodulation reference signal may be used for demodulation purposes. The existing demodulation reference signal patterns may be used on a non-prime carrier. According to some of the various aspects of embodiments, demodulation reference signal may be punctured if it overlaps with other signals on the same radio resources. According to some of the various aspects of embodiments, the common reference signal (common reference signal) may be configured to not be transmitted in every subframe to reduce common reference signal overhead. In another example embodiment, the common reference signal (common reference signal) may be configured to not be transmitted at all in a non-backward compatible carrier. According to some of the various aspects of embodiments, a non-prime carrier may carry one reference signal port within one subframe with a 5 ms periodicity. For example, one reference signal port may comprise LTE common reference signal port 0 resource elements per physical resource block and Rel-8 common reference signal sequence. In some embodiments, common reference signal may not be used for demodulation. In a prime carrier, common reference signal spans substantially the entire bandwidth of the carrier. In a non-prime carrier, bandwidth of the common reference signal port may be one of: (a) a full carrier bandwidth; (b) the minimum of system bandwidth and X, where X is for example 6 or 25 resource blocks; and (c) configurable (for example by base station transmitting RRC message(s) to wireless device when the carrier is configured) between full system bandwidth and the minimum of system bandwidth and X. For example, X may be selected from 6 or 25 resource blocks. In a synchronized non-prime carrier, common reference signal overhead may be reduced compared with legacy carriers. For example, common reference signal in a synchronized non-prime carrier may be the same as common reference signal in an unsynchronized non-prime carrier. In another example embodiment, common reference signal overhead may be further reduced compared with unsynchronized non-prime carriers or may not be transmitted.

Non-prime carriers may be configured to not support all transmission modes. For example, transmission modes 1 to 8 may not be supported on a non-prime carrier, since the radio resource configuration may not be compatible with transmission modes 1 to 8. According to some of the various aspects of embodiments, multiple layers of transmissions may be supported on a non-prime carrier. For example, up to eight layer transmission schemes may be supported on a non-prime carrier.

According to some of the various aspects of embodiments, for FDD: SSS and PSS may be transmitted in OFDM symbol 1 and 2, respectively; and may be transmitted in the first slot of subframe 0 and 5 with normal and extended cyclic prefix. For TDD, the OFDM symbol spacing and ordering between SSS and PSS may be the same as Rel-8. According to some of the various aspects of embodiments, SSS may precede PSS. There may be two OFDM symbols between SSS and PSS. The radio resource location of SSS and PSS in time may be different when compared with legacy carriers.

Potential motivations for changing the time/frequency location relative to LTE Rel-8, may be: preventing acquisition of a new carrier; reducing inter-cell interference; and avoiding demodulation reference signal overlap in central 6 physical resource blocks. According to some of the various aspects of embodiments, the time location of the PSS/SSS in a frame and/or subframe may be changed and the frequency location of PSS/SSS may not be changed. The PSS/SSS may be transmitted at a different location in time in the same or different subframe compared with prime carriers. There may be no overlap between PSS/SSS radio resources of a prime carrier and a non-prime carrier operating in the same frequency. This may reduce PSS/SSS interference in overlapping areas. PSS/SSS configuration, such as the location and/or sequences of PSS/SSS may be pre-defined or may be communicated to a wireless device via higher layer signaling. The wireless device then may acquire the PSS/SSS of a non-prime carrier for time and/or frequency synchronization.

According to some of the various aspects of embodiments, PSS/SSS transmission on non-prime carriers may collide with demodulation reference signal. Many implementation options may be available to address this issue. For example, demodulation reference signal may be punctured when colliding with PSS/SSS to resolve the collision between PSS/SSS and demodulation reference signal. The non-prime carrier may use wireless device-specific reference signal for demodulation. On the legacy carrier, the wireless device-specific reference signal may be configured to not transmit in subframe 0 and subframe 5 in the central 6 resource blocks since the PSS/SSS transmitted in these resource blocks overlaps with the wireless device-specific reference signal locations. The motive for changing the PSS/SSS time locations would be to address the case where the PSS/SSS collide with the demodulation reference signal. According to some of the various aspects of embodiments, LTE Rel-10 procedure may be employed and the demodulation reference signal may not be transmitted in the resource blocks where the PSS/SSS are transmitted. The difference with Rel-10, is that for an additional carrier type in Rel-11, common reference signal overhead may be reduced and common reference signal may not to be used for demodulation purposes. In another example embodiment, the same sequences as release 8 may be employed for PSS/SSS and PSS/SSS time locations may be changed. It may be possible to use the same (or similar) cell searcher as used in legacy carriers (in Rel-8/9/10).

According to some of the various aspects of embodiments, for the cell acquisition/detection of a non-prime carrier, legacy detection/acquisition signals may be employed for a non-prime carrier. New time/frequency configurations of existing signals may be implemented. For unsynchronized non-prime carriers, Rel-8 PSS/SSS sequences may be transmitted. The time-frequency location of PSS/SSS relative to Rel-8 may be changed to prevent the acquisition of a non-prime carrier. Inter-cell carrier interference may reduce the reliability of synchronization signals (PSS/SSS) and broadcast information (PBCH) between interfering cells (for example between a macro cell and a small cell). A new time location of PSS/SSS may be applied on a non-prime carrier for interference co-ordinations so that the collision of the synchronization signals between interfering cells may be reduced or avoided.

According to some of the various aspects of embodiments, a wireless device supporting unsynchronized non-prime carrier may support the functionality of performing time/frequency synchronization on the non-prime carrier using the PSS/SS transmitted on that non-prime carrier. Implementation of synchronization in a synchronized non-prime carrier may be simpler and a wireless device may obtain synchronization information from the associated prime carrier. According to some of the various aspects of embodiments, a synchronized non-prime carrier may be configured to operate without PSS/SSS transmission for use in time and frequency tracking. A wireless device may use the synchronization obtained from the associated prime carrier. If PSS/SSS are not transmitted on the synchronized carriers, then demodulation reference signal puncturing or other solutions for PSS/SSS may not be needed to avoid the collision between PSS/SSS and demodulation reference signal. In another example embodiment, PSS/SSS may be transmitted on a synchronous non-prime carrier. A synchronized reference carrier may be a legacy carrier (prime carrier) synchronized with a synchronized non-prime carrier in time and/or frequency. In order to obtain synchronization information of the synchronized non-prime carrier, synchronization information of the synchronization reference carrier may be employed. The synchronization reference carrier may be configured in a wireless device via higher-layer signaling.

A mechanism may be implemented to prevent a wireless device (for example, an LTE release 8, 9 or 10 wireless device) from acquiring the PSS/SSS of a non-prime carrier (e.g. during the cell search process). The mechanism may be implemented at the physical layer or at higher layers. A wireless device may search for the legacy cells and may attach to a cell that transmits the legacy PSS/SSS. The wireless device may receive configuration information of carriers that the wireless device may employ for communications using carrier aggregation. The carrier configuration information may include, for example, FDD/TDD configuration, cyclic Prefix type, bandwidth, cell index/ID, uplink configuration, downlink configuration, configuration for physical channels, associated prime carrier, cross carrier scheduling configuration, a combination of the above, and/or the like.

According to some of the various aspects of embodiments, wireless devices may consider the new time location of PSS/SSS radio resources to identify a non-prime carrier type and not to spend considerable resources on any subsequent procedures after PSS/SSS acquisition (and before being barred from further camping on the non-prime type at a later stage). Physical layer procedures may be employed to distinguish a prime carrier from a non-prime carrier. The wireless device may search for the prime carriers and may be configured to not look for non-prime carriers. According to some of the various aspects of embodiments, a physical a new time location of PSS/SSS may not be effective mechanism to bar legacy devices. A wireless device may be able to decode the new PSS (e.g., if the new PSS is identical to the old PSS except a certain symbol offset), depending on implementation, and the wireless device may identify a successful SSS decoding. According to some of the various aspects of embodiments, physical layer mechanisms may prevent legacy wireless devices from acquiring non-prime carriers. In another example embodiment, legacy wireless devices may be prevented from acquiring non-prime carriers by higher layers. If physical layer mechanism does not prevent legacy wireless devices from acquiring non-prime carries, wireless devices may be able to detect/acquire the cell of a non-prime carrier and may try to select/reselect a non-prime cell. This may degrade legacy wireless devices' performance in cell selection/reselection. If PSS/SSS of a non-prime cell is non-visible by legacy wireless devices and/or is distinguishable by legacy wireless devices, legacy wireless devices may not be able to select/reselect the non-prime cell. This may be a solution for legacy wireless devices, and it may enable Rel-11 wireless devices to differentiate non-prime carriers from prime carriers by PSS/SSS detection.

If a wireless device physical layer does not detect the differences between prime and non-prime carriers, and if legacy wireless device physical layer detects/acquires a non-prime carrier, then wireless device may employ higher layer signaling rules to prevent measurement, selecting and/or reselecting a non-prime cell. A wireless device may not be able to receive higher layer signaling information on a non-prime carrier, for example broadcast control channel. Wireless device behavior when higher level essential information is missing may be triggered and higher layer signaling may prevent legacy wireless devices from selecting/reselecting a non-prime cell. The higher layer mechanisms may be implemented to prevent legacy wireless devices access to non-prime cells.

Since non-prime carriers may operate jointly with backward compatible carriers (prime carriers) and may only operate in an RRC connected state, a wireless device may obtain some RRC information (for example, cell configuration parameters) before accessing non-prime carriers. According to some of the various aspects of embodiments, non-prime carriers may be configured to operate without transmitting PBCH and/or other system information blocks. Paging may be configured to be transmitted on prime carriers, which may include a primary cell for a wireless device. Paging may be configured to not transmit on non-prime carriers. Random access responses may be supported only on a primary carrier. Common control channels may be configured to broadcast on prime carriers. Non-primary carriers may be configured to not broadcast common control channels. Non-prime carriers may be configured to operate without common search space on physical control channel. Common search space may be defined exclusively for PDCCH resources in a primary carrier.

According to some of the various aspects of embodiments, enhanced PDCCH on a non-prime carrier may be supported. Cross-carrier scheduling from another carrier, for example the associated prime, carrier may be supported. A cross-carrier scheduling scheme may be implemented for resource allocation on non-prime carriers. Enhanced PDCCH may be transmitted on a non-prime carrier. Non-prime carriers may be configured to operate without transmitting legacy PDDCH. Cross carrier scheduling from another carrier employing a carrier indication field may be configured. The usage of enhanced PDCCH and cross carrier scheduling may be configurable using RRC messages. Enhanced PDCCH configuration of a non-prime carrier may be communicated to a wireless device employing RRC signaling when the non-prime carrier is configured. Enhanced PDDCH configuration parameters may comprise a frequency offset and/or bandwidth in terms of resource blocks. According to some of the various aspects of embodiments, additional fields such as: the starting symbol of an enhanced PDCCH, the starting symbol of PDSCH, an enhanced PHICH configuration, a combination of the above, and/or the like may be configured for a non-prime carrier in the wireless device. These parameters may be configured via RRC signaling, for example when a non-prime carrier is configured.

A non-prime carrier may be configured to operate without PCFICH. An enhanced PDCCH configuration may be transmitted to the wireless device employing RRC signaling. When cross carrier scheduling is used, the PHICH for the non-prime uplink carrier may be transmitted on the scheduling downlink carrier. According to some of the various aspects of embodiments, when enhanced PDCCH on a non-prime carrier is implemented, enhanced PHICH on the non-prime carrier may be configured. Radio resources of enhanced PHICH may employ the resource blocks employed for the enhanced PDCCH of a non-prime carrier. The enhanced PHICH and enhanced PDCCH on a non-prime carrier may employ different resource elements if a given resource block. The resource elements may not be shared between enhanced PDCCH and enhanced PHICH. In another example embodiment, PHICH may be transmitted on the associated prime carrier. PHICH or enhanced PHICH may be transmitted on a downlink carrier. PHICH or enhanced PHICH for an uplink carrier may carry ack/nack for packets transmitted on the uplink carrier.

According to some of the various aspects of embodiments, non-prime carriers may be configured to operate without transmitting PBCH, SIBs, paging messages, random access responses, legacy PDCCH, PCFICH, a combination of the above, and/or the like. In another example embodiment, some of control channels, for example PBCH, may be maintained in a non-prime carrier. Common reference signal symbols overhead may also be reduced compared with prime carriers.

According to some of the various aspects of embodiments, non-prime carriers may be employed to reduce inter-cell interference. In legacy systems, synchronization signals of different carriers transmitted in the same frequency may interfere with each other. According to some of the various aspects of embodiments, the PSS/SSS of a prime carrier may be configured to not overlap with PSS/SSS of a non-prime carrier. In another example embodiment, synchronized non-prime carriers may be configured to operate without transmitting PSS/SSS. This may reduce interference due to synchronization signals on other downlink carriers transmitted in the same frequency in the overlapping coverage areas. According to some of the various aspects of embodiments, common reference signal overhead may be reduced in non-prime downlink carriers. Reduction in common reference signal transmission in non-prime carriers compared with prime carriers may reduce interference due to common reference signals on other downlink carriers transmitted in the same frequency.

According to some of the various aspects of embodiments, the starting symbol of enhanced PDCCH and/or PDSCH on a non-prime carrier may be configurable in all or a subset of subframes of a non-prime carrier. At least one RRC reconfiguration message may indicate the configuration parameters of a non-prime carrier to the wireless device, including enhanced PDCCH and PDSCH configuration parameters and subframes that the configuration is applicable. For example, the starting symbol may be configured as the first, second, third, or forth symbol in a subset of subframes or all subframes. If PDSCH and/or enhanced PDCCH start, for example, from the third symbol in a subframe, no or a substantially reduced signal power may be transmitted in the first and second symbols of a subframe. The initial symbols (first and second symbols of a subset or all subframes in this example) on another prime downlink carrier operating on the same frequency may be employed for transmission of PDCCH. Such a configuration may reduce inter-cell interference between cells with an overlapping coverage area operating in the same frequency. A more reliable PDCCH transmission may be achieved. For example, a potential interferer non-prime cell may be configured to not transmit at a high power when another prime cell is transmitting PCFICH/PDCCH/PHICH symbols in the same cell frequency. In another example embodiment, enhanced PDCCH and PDSCH on a non-prime carrier may start from the first symbol to increase physical resources available to enhanced PDCCH and PDSCH of a non-prime carrier. In this configuration, the first symbol of a frame may be employed for control and data transmission, and base station may start enhanced PDCCH and PDSCH transmission from the first symbol of a frame and end at the last symbol of the subframe.

According to some of the various aspects of embodiments, a non-prime carrier may include enhanced PDCCH resources. Enhanced PDCCH may act as PDCCH for the non-prime carrier. Enhanced PDCCH may carry scheduling information for downlink and uplink shared channels and may also carry power control information for uplink transmissions. Beamforming and/or special multiplexing may be employed for enhanced PDCCH. For example, scheduling packets of two different wireless devices may share the same enhanced PDCCH resources using spatial multiplexing techniques. A non-prime carrier may not be initially defined for standalone operation. A non-prime carrier may be associated with a backward compatible carrier. According to some of the various aspects of embodiments, a non-prime carrier may be contiguously deployed next to the associated prime carrier. In a non-prime carrier, PDSCH may be scheduled independently from the other aggregated carriers employing enhanced PDCCH and with independent HARQ processes. PDSCH in a non-prime carrier may be cross-carrier scheduled by the other aggregated carrier.

In case of cross-carrier scheduling in LTE Rel-10 carrier aggregation, the PDSCH of a carrier may be cross carrier scheduled by PDCCH of another carrier. The PDSCH starting position of the scheduled carrier may be RRC-signaled to the wireless device. In LTE Rel-10 carrier aggregation, the starting position of PDSCH cannot be configured to be the first symbol. PCFICH transmission is mandatory, and PDCCH and PHICH should be configured. PDCCH transmission should be supported in all subframes. At least transmission of system information blocks and/or other necessary control information may be supported on a carrier without employing cross carrier scheduling, and this require PDCCH resources of the carrier. The mandatory configuration of PCFICH, PDCCH, and/or PHICH on carriers including carriers that are cross carrier scheduled may reduce spectral efficiency in release 10 or before LTE carriers. Furthermore, in legacy systems the starting symbol of PCFICH and PDCCH is not configurable and should always start from the first symbol in LTE subframes.

A non-prime carrier may be configured to not transmit enhanced PDCCH and/or PDSCH in its starting OFDM symbol(s) in a subframe. A base station may configure the starting OFDM symbol(s) in a subframe of a non-prime carrier in order to reduce transmission power in some of initial OFDM symbols for the purpose of interference coordination (e.g. scenarios where one cell employs legacy PDCCH and another cell employs enhanced PDCCH). The PDSCH and/or enhanced PDCCH starting position of a non-prime carrier may be transmitted to the wireless device employing RRC messages. A non-prime carrier may be configured to not carry the legacy PDCCH. The RRC signaling for non-prime carrier configuration may indicate the very first OFDM symbol in a subframe as the PDSCH starting position, unlike legacy LTE systems. The enhanced PDCCH starting position may be the same as the PDSCH starting position. In another example embodiment, the enhanced PDCCH starting position may not be same as the PDSCH starting position.

Legacy PDCCH may not be present on a non-prime carrier. In this case, the scheduling may be done through at least one of the following two ways: a) cross-carrier scheduling from another carrier (for example, the associated backward-compatible carrier or another carrier); or b) enhanced PDCCH may be configured on the non-prime carrier so as to improve control channel capacity and provide interference coordination on the control channel. Enhanced PDDCH of interfering cells may be configured in a way that enhanced PDDCH of interfering cells may not overlap or may have reduced overlap in radio resources. If cross-carrier scheduling is employed, there may be no need for PHICH and PCFICH on the non-prime carrier. The HARQ ack/nack feedback may be transmitted on the scheduling carrier. If enhanced PDCCH is used in a non-prime carrier, a PHICH may be implemented for the non-prime carrier.

The enhanced PDCCH radio resources may be configurable. The configuration may comprise at least one of the following: i) a starting frequency offset in terms of a first number of radio resource blocks; ii) bandwidth of enhanced physical downlink control channel in terms of a second number of radio resource blocks; iii) starting time in a subframe in terms of number of symbols; iv) ending time in a subframe in terms of slots (or symbols); v) beamforming information for the physical downlink control channel, and/or vi) a combination of the some of the parameters above. According to some of the various aspects of embodiments, enhanced PDCCH configuration may be in the form of an array where an element in the array may include the above parameters. Enhanced PDCCH may include many non-overlapping radio resource segments in a non-prime carrier.

Example embodiments of the invention may enable transmission and reception of control and data traffic in a multicarrier OFDM communication system. Other example embodiments may comprise a non-transitory tangible computer readable media comprising instructions executable by one or more processors to cause transmission and reception of control and data traffic in a multicarrier OFDM communication systems. Yet other example embodiments may comprise an article of manufacture that comprises a non-transitory tangible computer readable machine-accessible medium having instructions encoded thereon for enabling programmable hardware to cause a device (e.g. wireless communicator, wireless device, base station, etc.) to enable transmission and reception of control and data traffic in a multicarrier OFDM communication system. The device may include processors, memory, interfaces, and/or the like. Other example embodiments may comprise communication networks comprising devices such as base stations, wireless devices (wireless device), servers, switches, antennas, and/or the like.

Figure 5:
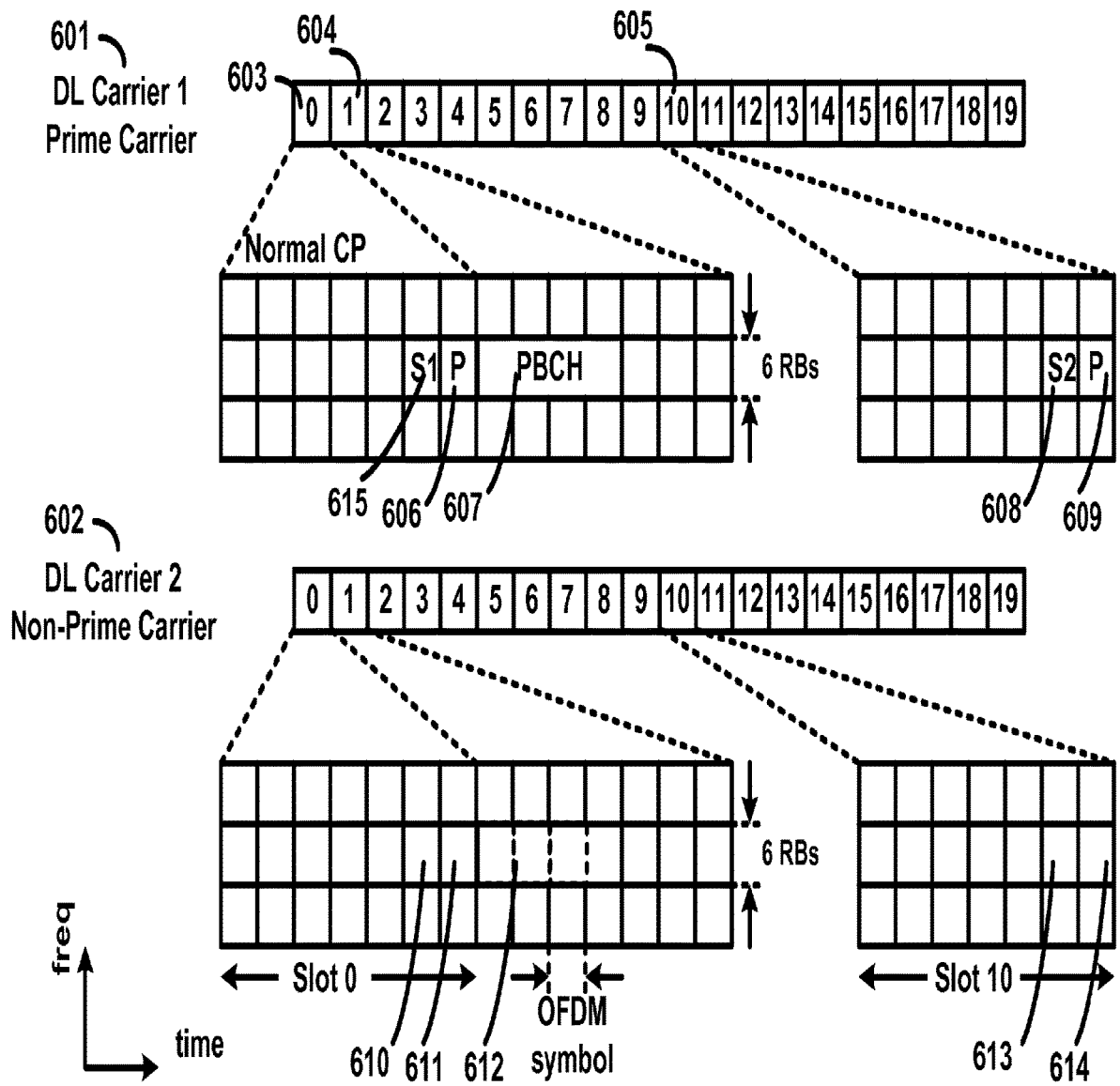
FIG. 5 is a diagram depicting example time and frequency resources for two downlink carriers as per an aspect of an embodiment of the present invention.
Figure 6:
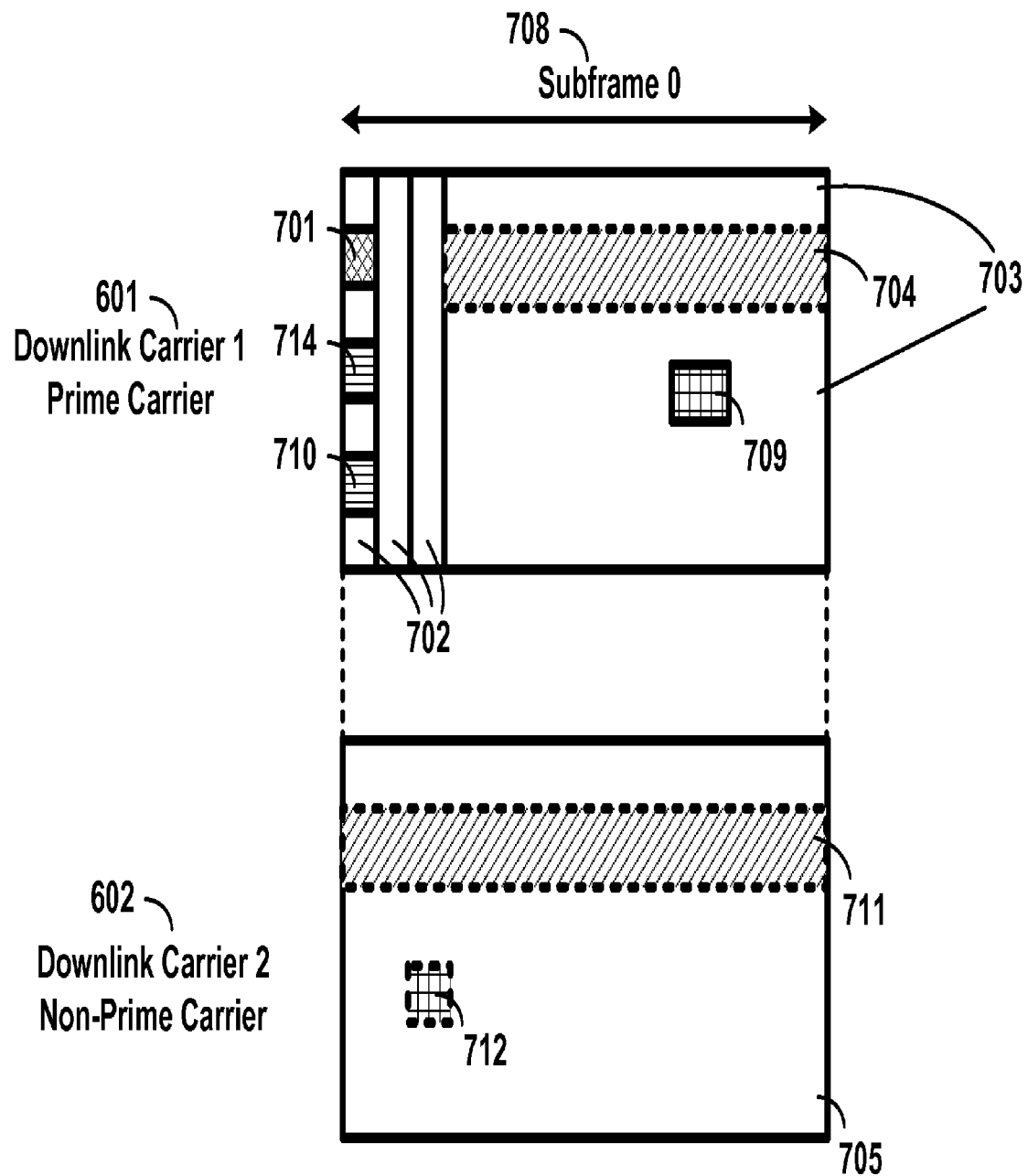
FIG. 6 is a diagram illustrating a synchronization channel, data channel and control channel as per an aspect of an embodiment of the present invention.

FIG. 5 is a diagram depicting example time and frequency resources for prime carrier 601 and non-prime carrier 602 as per an aspect of an embodiment of the present invention. FIG. 6 is a diagram illustrating synchronization, data and control transmission channels as per an aspect of an embodiment of the present invention. A base station may transmit to at least one wireless device a synchronization signal 615, 606, 608, 609 comprising a primary synchronization signal 606, 609 and a secondary synchronization signal 615, 608 on the prime carrier 601. The synchronization signal may indicate a physical cell ID for a cell comprising the prime carrier 601. The synchronization signal may also provide timing information for the prime carrier 601. The synchronization signal may be transmitted employing a plurality of subcarriers substantially in the center of the frequency band of the prime carrier 601 on the first and sixth subframes (subframe 0 and 5) of a frame in the plurality of frames. Primary and secondary synchronization signals may occupy a bandwidth of approximately six resource blocks. The base station may broadcast to at least one wireless device physical broadcast channel (PBCH) 607 in slot one 604 of subframe 0 of the prime carrier 601. At least one wireless device may receive the synchronization signals to obtain and/or track carrier frame and subframe timing. At least one wireless device may receive PBCH signal to obtain at least one configuration parameter of the downlink carrier.

According to some of the various aspects of embodiments, a base station may transmit a first synchronization signal 615, 606, 608, 609 comprising a primary synchronization signal 606, 609 and a secondary synchronization signal 615, 608 on the prime carrier 601. The first synchronization signal may indicate a physical cell ID for a cell comprising the prime carrier 601. The first synchronization signal may provide timing information for the prime carrier 601. A second synchronization signal may be transmitted on the non-prime carrier. The second synchronization signal may be transmitted employing a plurality of subcarriers substantially in the center of the frequency band of the non-prime carrier 602 employing six resource blocks. A second synchronization signal may comprise a second primary synchronization signal and a second secondary synchronization signal. According to some of the various aspects of embodiments, the second synchronization signal may be transmitted on a second time location (different from time location of the first synchronization signal) in the same or different subframe compared with the first synchronization signal. The second synchronization signal may provide timing information for the non-prime carrier 602. In another example embodiment, a non-prime carrier may carry synchronization signal in resources 610, 611, 613, and 614 similar to prime carriers.

The base station may transmit to at least one wireless device a first plurality of data packets on a first data channel 703 of the prime carrier 601 on a first plurality of OFDM subcarriers. A first plurality of OFDM subcarriers may exclude a plurality of subcarriers used for transmission of the primary 606, 609 and secondary 615, 608 synchronization signals in the first and sixth subframes in the plurality of frames. A first plurality of OFDM subcarriers may exclude a plurality of subcarriers used for transmission of the PBCH 607. PSS/SSS/PBCH resources 709 on the prime carrier 601 in an example subframe 708 are illustrated in FIG. 6.

The base station may transmit a first plurality of broadcast system information messages (SIB messages) on the first data channel 703 employing, for example, radio resources 704. The plurality of broadcast system information messages may comprise a plurality of radio link configuration parameters of the prime carrier 601 for a wireless device receiving the prime carrier 601 and the non-prime carrier 602 signals. An example radio resource 704 employed for SIB message transmission is illustrated in FIG. 6. SIB messages may be transmitted continuously and may be transmitted on a subset of the downlink subframes of the prime carrier 601. System information of the non-prime carrier 602 may be received via at least one unicast RRC message when the non-prime carrier 602 is configured by higher layers. According to some of the various aspects of embodiments, the at least one unicast RRC message may be transmitted on the first data channel 703 of the prime carrier 601. The non-prime carrier 602 may be configured to operate without broadcasting the system information blocks on the non-prime carrier 602. The base station may transmit a second plurality of data packets on a second data channel 705 on a second plurality of OFDM subcarriers of the non-prime carrier 602.

According to some of the various aspects of embodiments, the second plurality of OFDM subcarriers of the non-prime carrier 602 may comprise the OFDM subcarriers substantially in the center of the frequency band at symbols 610, 611, 613, and 614 of the non-prime carrier 602 in the first and sixth subframes in the plurality of frames. No primary synchronization signal and no secondary synchronization signal may be transmitted on the second carrier in radio resource 610, 611, 613, and 614. The non-prime carrier may be configured to operate without transmitting primary synchronization signal and secondary synchronization signal in radio resource 610, 611, 613, and 614. No broadcast system information message (SIB messages) may be transmitted on the second data channel 705. The non-prime carrier 602 may be configured to operate without transmitting or broadcasting system information message (SIB messages). No physical broadcast channel may be transmitted in radio resource 612. The non-prime carrier 602 may be configured to operate without transmitting physical broadcast channel in radio resource 612. According to some of the various aspects of embodiments, if non-prime carrier 602 is a synchronized non-prime carrier, subframe timing of the non-prime carrier 602 may be provided by the synchronization signal transmitted on the prime carrier 601. In another example embodiment, if the non-prime carrier 602 is an unsynchronized non-prime carrier, subframe timing of the non-prime carrier 602 may be provided by a second synchronization signal transmitted on the non-prime carrier 602. According to some of the various aspects of embodiments, if synchronization signals are transmitted on a non-prime carrier 602, radio resources 712 of synchronization signal may be in a different time location in the same subframe 708 (as shown in FIG. 6) or in a different subframe (not shown in the figure).

The first plurality of data packets and the second plurality of data packets may be transmitted using a plurality of physical resource blocks. A physical resource block may comprise reference signal symbols and data symbols. The broadcast system information messages may be RRC system information blocks (SIBs). The radio link configuration information may comprise measurement configuration, uplink channel configuration, handover parameters, and/or the like.

The primary synchronization signal 606, 609 may be generated using a frequency-domain Zadoff-Chu sequence. The primary synchronization signal 606, 609 may be mapped to the last OFDM symbol in slots zero 603 and ten 605 for an FDD frame structure. The primary synchronization signal 606, 609 may be mapped to the third OFDM symbol in subframes 1 and 6 for the TDD frame structure. The secondary synchronization signal 615, 608 may be generated employing an interleaved concatenation of two 31 bit binary sequences. The concatenated sequence may be scrambled with a scrambling sequence given by the primary synchronization signal 606, 609. The portion of the secondary synchronization signal transmitted in subframe zero 615 may be different from the portion of the secondary synchronization signal transmitted in subframe five 608. If a non-prime carrier is configured to transmit synchronization signals, the synchronization signals transmitted on a prime carrier and the synchronization signals transmitted on the non-prime carrier may be selected from the same set of available sequences.

According to some of the various aspects of embodiments, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a first carrier configuration, the control channel 702 may be configured to provide transmission format and scheduling information for the first plurality of data packets transmitted on the prime carrier 601 and the second plurality of data packets transmitted on the non-prime carrier 602. The control channel 702 may be transmitted on the prime carrier 601 starting from the first OFDM symbol of a subframe. The control channel may be a physical downlink control channel. No physical control format indicator channels, no physical downlink HARQ indicator channel, and no physical downlink control channels may be transmitted on the non-prime carrier 602. The non-prime carrier 602 may be configured to operate without transmitting physical control format indicator channel, physical downlink HARQ indicator channel, and physical downlink control channel. Radio resources of the second data channel 705 may be configured to start from the first OFDM symbol of a subframe 708 of the non-prime carrier 602 and to end at the last OFDM symbol of the subframe of the non-prime carrier 602. No HARQ feedback may be transmitted on the non-prime carrier 602. The non-prime carrier 602 may be configured to operate without transmitting HARQ feedback on the non-prime carrier 602.

Figure 8:
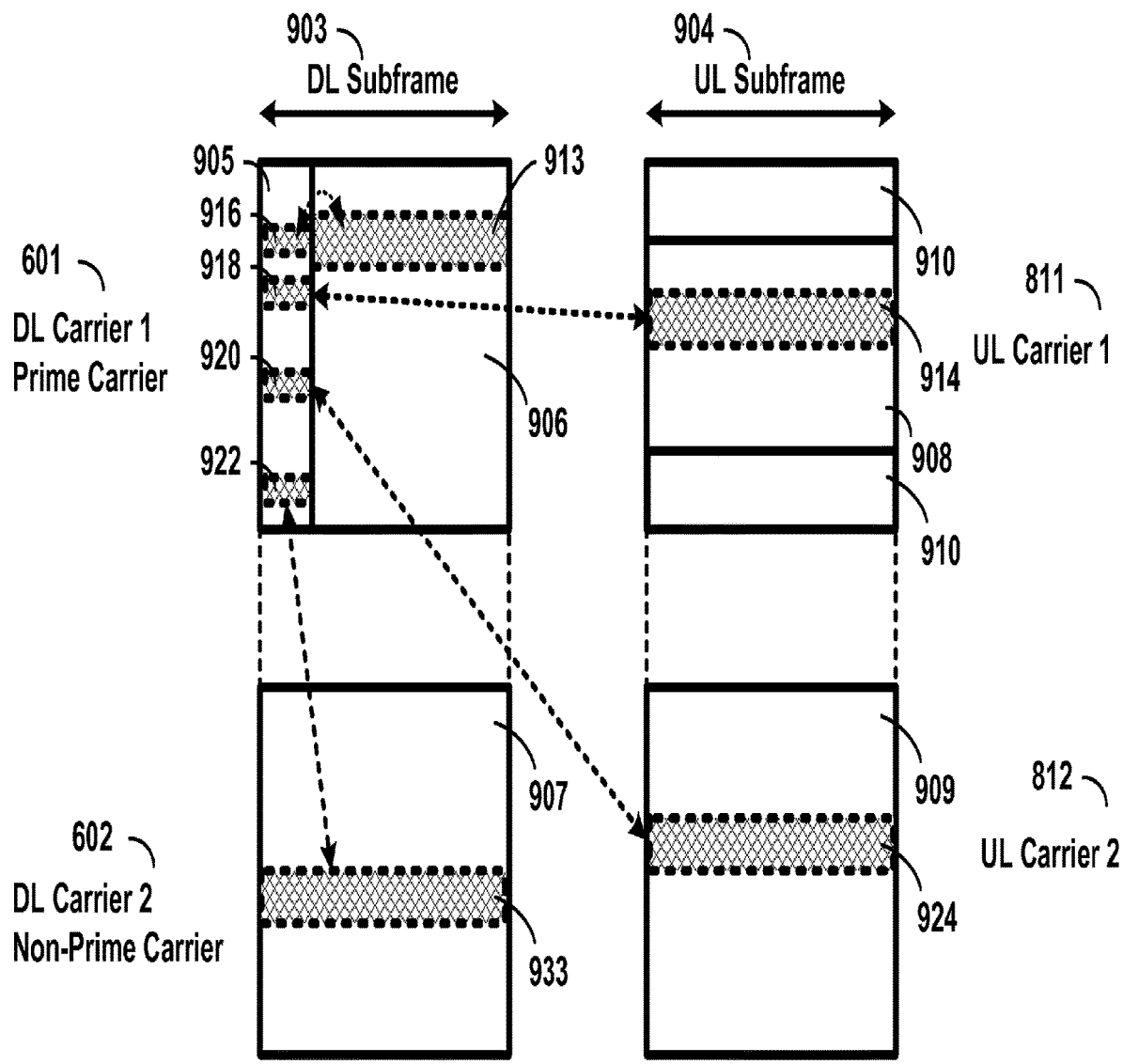
FIG. 8 is a diagram depicting example control and data transmission for downlink carriers and uplink carriers as per an aspect of an embodiment of the present invention.

FIG. 8 is a diagram depicting example control and data transmission for a prime downlink carrier 601, a non-prime downlink carrier 602, a prime uplink carrier 811, and a non-prime uplink carrier 812 as per an aspect of an embodiment of the present invention. Downlink subframe 903 may not be transmitted at the same time with uplink subframe 904. Radio resources 905 are employed for transmission of PCFICH, PDCCH, and PHICH. The downlink control channel (PDCCH) in radio resources 905 may be configured to provide transmission format and scheduling information for a first plurality of packets transmitted on a first downlink shared channel 906, a second plurality of packets transmitted on a second downlink shared channel 907, a third plurality of data packets transmitted on a first uplink shared channel 908, and a fourth plurality of data packets transmitted on a second uplink shared channel 909. For example control packet 916 may provide transmission format and scheduling information for data packet 913. Control packet 922 may provide transmission format and scheduling information for data packet 933. Control packet 918 may provide transmission format and scheduling information for data packet 914. Control packet 920 may provide transmission format and scheduling information for data packet 924. Control packets 918 and 920 may also comprise power control information for transmission of packets 914 and 924 respectively. The prime uplink carrier 811 may comprise: a) a first portion of bandwidth employed for the first uplink data channel 908; and b) a second portion of the bandwidth employed for a first uplink control channel 910.

According to some of the various aspects of embodiments, in a second carrier configuration, the control channel 702 may be configured to provide transmission format and scheduling information for the first plurality of data packets transmitted on the prime carrier 601. The control channel 702 may be transmitted on the prime carrier 601 starting from the first OFDM symbol of a subframe 708. The control channel may be a physical downlink control channel. Second control information may be transmitted on a second control channel 711 on the non-prime carrier 602. The second control channel 711 may be configured to provide transmission format and scheduling information for the second plurality of data packets transmitted on the non-prime carrier 602. The second control channel may be an enhanced physical downlink control channel. Radio resources of the second data channel 705 may be configured to start from the first OFDM symbol of a subframe of the non-prime carrier 602 and end at the last OFDM symbol of the subframe of the non-prime carrier 602.

Figure 7:
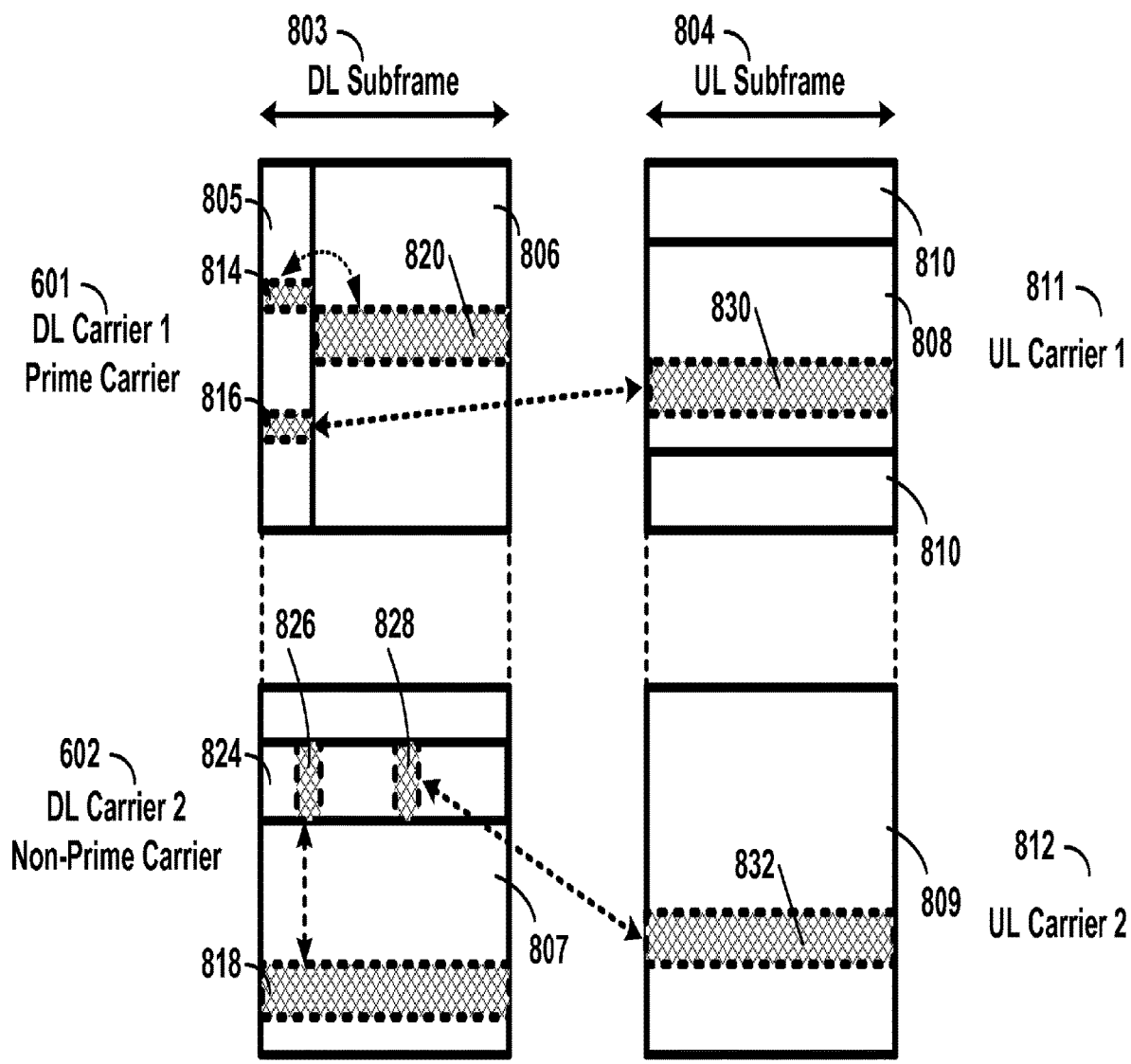
FIG. 7 is a diagram depicting example control and data transmission for downlink carriers and uplink carriers as per an aspect of an embodiment of the present invention.

FIG. 7 is a diagram depicting example control and data transmission for a prime downlink carrier 601, a non-prime downlink carrier 602, a prime uplink carrier 811, and a non-prime uplink carrier 812 as per an aspect of an embodiment of the present invention. Downlink subframe 803 may not be transmitted at the same time with uplink subframe 804. Radio resources 805 are employed for transmission of PCFICH, PDCCH, and PHICH. The downlink control channel (PDCCH) in radio resources 805 may be configured to provide transmission format and scheduling information for a first plurality of packets transmitted on a first downlink shared channel 806, and a third plurality of data packets transmitted on a first uplink shared channel 808. Enhance control channel 824 may be configured to provide transmission format and scheduling information for a second plurality of packets transmitted on a second downlink shared channel 807, and a fourth plurality of data packets transmitted on a second uplink shared channel 809. For example control packet 814 may provide transmission format and scheduling information for data packet 820. Control packet 816 may provide transmission format and scheduling information for data packet 830. Control packet 926 may provide transmission format and scheduling information for data packet 818. Control packet 928 may provide transmission format and scheduling information for data packet 832. Control packets 816 and 928 may also comprise power control information for transmission of packets 830 and 832 respectively. The prime uplink carrier 811 may comprise: a) a first portion of bandwidth employed for the first uplink data channel 808; and b) a second portion of the bandwidth employed for a first uplink control channel 810.

FIG. 7 and FIG. 8 illustrate two example carrier configurations. Carrier configurations are wireless device specific. A first wireless device connected to a base station may be configured with a first carrier configuration and a second wireless device connected to the same base station may be configured with a second carrier configuration. Therefore, a base station may provide both first and the second configurations. For a first wireless device the base station may employ cross carrier scheduling as shown in FIG. 8, and for a second wireless device the base station may employ enhanced PDCCH as shown in FIG. 8. A base station may support both configurations in parallel, a first configuration may be applied to a first wireless device, and a second configuration may be applied to a second wireless device. For the first wireless device, the PDCCH in radio resource 905 may be configured to provide transmission format and scheduling information for a first plurality of packets transmitted on a first downlink shared channel 906, a second plurality of packets transmitted on a second downlink shared channel 907, a third plurality of data packets transmitted on a first uplink shared channel 908, and a fourth plurality of data packets transmitted on a second uplink shared channel 909. During the same period, the downlink control channel (PDCCH) in radio resources 805 may be configured to provide transmission format and scheduling information for a first plurality of packets transmitted on a first downlink shared channel 806, and a third plurality of data packets transmitted on a first uplink shared channel 808. Enhance control channel 824 may be configured to provide transmission format and scheduling information for a second plurality of packets transmitted on a second downlink shared channel 807, and a fourth plurality of data packets transmitted on a second uplink shared channel 809.

According to some of the various aspects of embodiments, in a third carrier configuration, the control channel 702 may be configured to provide transmission format and scheduling information for the first plurality of data packets transmitted on the prime carrier 601 and the second plurality of data packets transmitted on the non-prime carrier 602. The control channel 702 may be transmitted on the prime carrier 601 starting from the first OFDM symbol of a subframe. The control channel may be a physical downlink control channel. No physical control format indicator channels, no physical downlink HARQ indicator channel, and no physical downlink control channels may be transmitted on the non-prime carrier 602. The non-prime carrier 602 may be configured to operate without transmitting physical control format indicator channel, physical downlink HARQ indicator channel, and physical downlink control channel. No HARQ feedback may be transmitted on the non-prime carrier 602. The non-prime carrier 602 may be configured to operate without transmitting HARQ feedback on the non-prime carrier 602. The starting symbol of radio resources of the second physical downlink shared channel 705 may be indicated by at least one control message. For example, the starting symbol of the second physical downlink shared channel 705 may be configured to start from the third symbol of a subframe. In this configuration, the first and second symbol of the subframe may not be employed for transmission of control and data channels. The base station may transmit substantially reduced power or no power in the first two symbols of the subframe. In an implementation option, the ending symbol of the second physical downlink shared channel 705 may be indicated by at least one control message.

According to some of the various aspects of embodiments, in a fourth carrier configuration, the control channel 702 may be configured to provide transmission format and scheduling information for the first plurality of data packets transmitted on the prime carrier 601. The control channel 702 may be transmitted on the prime carrier 601 starting from the first OFDM symbol of a subframe 708. The control channel may be a physical downlink control channel. Second control information may be transmitted on a second control channel 711 on the non-prime carrier 602. The second control channel 711 may be configured to provide transmission format and scheduling information for the second plurality of data packets transmitted on the non-prime carrier 602. The second control channel may be an enhanced physical downlink control channel. The starting symbol of radio resources of the second physical downlink shared channel 705 and/or the second control channel 711 may be indicated by at least one control message. For example, the starting symbol of the second physical downlink shared channel 705 and/or the second control channel 711 may be configured to start from the third symbol of a subframe. In this configuration, the first and second symbol of the subframe may not be employed for transmission of control and data channels. The base station may transmit substantially reduced power or no power in the first two symbols of the subframe. In an implementation option, the ending symbol of the second physical downlink shared channel 705 and/or the second control channel 711 may be indicated by at least one control message.

Radio resources 709 may be configured to provide a synchronization signal on the prime carrier 601. In an example carrier configuration, if the non-prime carrier is configured to carry a synchronization signal, radio resources 712 may be configured to provide the second synchronization signal on the non-prime carrier. In another example embodiment, the non-prime carrier may be configured to operate without transmitting the second synchronization signal. In that case, a wireless device may employ the synchronization signal 609 transmitted on the prime carrier 601 for frame and subframe timing of the prime carrier 601 and the non-prime carrier 602.

As shown in FIG. 6, radio resources employed by enhanced PDCCH may be configured to span in a limited number of configured resource blocks starting from an offset frequency configured in terms of the resource blocks. PCFICH may not be transmitted on a non-prime carrier, and enhanced PDCCH configuration may be transmitted to the wireless device via RRC messages transmitted on a prime carrier. Radio resources employed for PDSCH may span the entire active prime carrier bandwidth in frequency excluding the resource blocks employed by enhanced PDCCH. According to some of the various aspects of embodiments, if synchronization signal and/or PBCH are transmitted in a subframe, PDSCH resources may exclude the resource blocks 712 employed by synchronization signal and/or PBCH in the subframe. According to some of the various aspects of embodiments, enhanced PDCCH 711 and PDSCH 705 radio resources may start from the first symbol of a subframe and end at the last symbol of the subframe. Enhanced PDCCH 711 and PDSCH 705 radio resources may span the entire duration of a subframe in time. In another example implementation, the starting symbol and/or the ending symbol of enhanced PDCCH and PDSCH in all or a subset of subframes may be a configurable parameter and may be indicated to a wireless device employing RRC signaling. In an example implementation, some of the resource elements of resource blocks employed for enhanced PDCCH may be employed for an enhanced PHICH transmission.

Enhanced PHICH may carry ack/nack for uplink packets transmitted on the non-prime uplink carrier. A control packet transmitted on enhanced PDCCH may employ a subset of resources allocated to enhanced PDCCH. A packet transmitted on PDSCH may employ a subset of resources allocated to PDSCH.

The first plurality of data packets and the second plurality of data packets may be encrypted packets. The first plurality of data packets and the second plurality of data packets may be assigned to a radio bearer. A first plurality of packets that are assigned to the same radio bearer may be encrypted using an encryption key and at least one parameter that changes substantially rapidly over time. An example of the parameter that changes substantially rapidly over time may be a counter, for example, a packet sequence number.

RRC messages may be encrypted and may be protected by an integrity header before it is transmitted. The at least one control message may be transmitted by an RRC protocol module. The at least one control message may further comprise configuration information for physical channels for a wireless device. The at least one control message may set up or modify at least one radio bearer. The at least one control message may modify configuration of at least one parameter of a MAC layer or a physical layer. The at least one control message may be an RRC connection reconfiguration message.

The transmission and reception mechanisms in the example embodiments may increase bandwidth efficiency in the system. The proposed transmission and reception mechanisms may provide a set of constraints for assigning wireless physical resources to data and control packet transmission that may result in increased overall air interface capacity. The non-prime carrier may be employed to provide additional capacity. In the example embodiments, the non-prime carrier may not carry some of the physical channels that are required, for example, in LTE release 8, 9 and 10. This may improve wireless interface spectral efficiency.

In an example embodiment of the invention implemented in an LTE network, the first control channel may be a physical control format indicator channel (PCFICH), the second control channel may be a physical downlink control channel (PDCCH), and the first and second data channels may be the first and second physical downlink shared channels (PDSCH). Downlink HARQ feedback may be transmitted employing a physical HARQ indicator channel (PHICH), and the physical broadcast channel may comprise at least one information field related to system information.

According to some of the various aspects of embodiments, PCFICH, PDCCH, PBCH, BCCH, and/or PCH may be transmitted on the prime carrier. The non-prime carrier may be configured to operate without transmitting PCFICH, PDCCH, PBCH, BCCH and/or PCH in any subframe. PDCCH transmitted on the prime carrier may transmit scheduling packets for the first and second PDSCH. An example embodiment may eliminate PCFICH and PDCCH transmission on the non-prime carrier and release the capacity that should have been used for these control channels to PDSCH. This may increase the data capacity of the second carrier, and may increase the spectral efficiency of the system. According to some of the various aspects of embodiments, a carrier in the plurality of carriers may be classified as a prime carrier or a non-prime carrier, wherein the transmitter transmits at least one prime carrier and at least one non-prime carrier. The prime carriers may transmit PCFICH, PDCCH, PBCH, BCCH, PCH channels, and/or the like. The non-prime carriers may be configured to operate without transmitting the PCFICH, PDCCH, SS, PBCH, BCCH, PCH channels, and/or the like. The scheduling packets corresponding to data packets transmitted on non-prime carriers may be transmitted in PDCCH channels of one of the prime carriers. The resources allocated to the data channel in non-prime carriers may start from the first symbol of a subframe.

According to some of the various aspects of embodiments, a wireless device may receive from a base station a synchronization signal 615, 606, 608, 609 comprising a primary synchronization signal 606, 609 and a secondary synchronization signal 615, 608 on the prime carrier 601. The synchronization signal may indicate a physical cell ID for a cell comprising the prime carrier 601. The synchronization signal may also provide timing information for the prime carrier 601 and the non-prime carrier 602 in the plurality of carriers. The synchronization signal may be received employing a plurality of subcarriers substantially in the center of the frequency band of the prime carrier 601 on the first and sixth subframes (subframe 0 and 5) of each frame in the plurality of frames. Primary and secondary synchronization signals may occupy a bandwidth equal to six resource blocks. The wireless device may receive a physical broadcast channel (PBCH) 607 in slot one 604 of subframe 0 of the prime carrier 601. In one example embodiment, radio resources 610, 611, 612, 613 and 614 may not be employed for reception of a synchronization signal and PBCH. These resources may be employed for receiving data on the downlink carrier. For example, these radio resources may be employed for reception of data packets on a non-prime carrier physical downlink shared channel.

According to some of the various aspects of embodiments, a wireless device may receive a first synchronization signal 615, 606, 608, 609 comprising a primary synchronization signal 606, 609 and a secondary synchronization signal 615, 608 on the prime carrier 601. The first synchronization signal may indicate a physical cell ID for a cell comprising the prime carrier 601. The first synchronization signal may provide timing information for the prime carrier 601. A second synchronization signal may be received on the non-prime carrier. The second synchronization signal may be received employing a plurality of subcarriers substantially in the center of the frequency band of the non-prime carrier 602 employing six resource blocks. A second synchronization signal may comprise a second primary synchronization signal and a second secondary synchronization signal. According to some of the various aspects of embodiments, the second synchronization signal may be received on a second time location (different from time location of the first synchronization signal) in the same or different subframe compared with the first synchronization signal. The second synchronization signal may provide timing information for the non-prime carrier 602.

The wireless device may receive from the base station a first plurality of data packets on a first data channel 703 of the prime carrier 601 on a first plurality of OFDM subcarriers. A first plurality of OFDM subcarriers may exclude a plurality of subcarriers used for transmission of the primary 606, 609 and secondary 615, 608 synchronization signals in the first and sixth subframes in the plurality of frames. A first plurality of OFDM subcarriers may exclude a plurality of subcarriers used for transmission of the PBCH 607. PSS/SSS/PBCH resources 709 on the prime carrier 601 in an example subframe 708 are illustrated in FIG. 6.

The wireless device may receive from the base station a first plurality of broadcast system information messages (SIB messages) on the first data channel 703 employing, for example, radio resources 704. The plurality of broadcast system information messages may comprise a plurality of radio link configuration parameters of the prime carrier 601 for the wireless device receiving the prime carrier 601 and the non-prime carrier 602 signals. An example radio resource 704 employed for SIB message transmission is illustrated in FIG. 6. SIB messages may be received continuously and may be received on a subset of the downlink subframes of the prime carrier 601. System information of the non-prime carrier 602 may be received via at least one unicast RRC message when the non-prime carrier 602 is configured by higher layers. According to some of the various aspects of embodiments, the at least one unicast RRC message may be received on the first data channel 703 of the prime carrier 601. The non-prime carrier 602 may be configured to operate without broadcasting the system information blocks on the non-prime carrier 602. The wireless device may receive a second plurality of data packets on a second data channel 705 on a second plurality of OFDM subcarriers of the non-prime carrier 602.

According to some of the various aspects of embodiments, the second plurality of OFDM subcarriers of the non-prime carrier 602 may comprise the OFDM subcarriers substantially in the center of the frequency band at symbols 610, 611, 613, and 614 of the non-prime carrier 602 in the first and sixth subframes in the plurality of frames. No primary synchronization signal and no secondary synchronization signal may be received on the second carrier in radio resource 610, 611, 613, and 614. The non-prime carrier may be configured to operate without receiving primary synchronization signal and secondary synchronization signal in radio resource 610, 611, 613, and 614. No broadcast system information message (SIB messages) may be received on the second data channel 705. The non-prime carrier 602 may be configured to operate without receiving system information message (SIB messages). No physical broadcast channel may be received in radio resource 612. The non-prime carrier 602 may be configured to operate without receiving physical broadcast channel in radio resource 612. According to some of the various aspects of embodiments, if non-prime carrier 602 is a synchronized non-prime carrier, subframe timing of the non-prime carrier 602 may be provided by the synchronization signal received on the prime carrier 601. In another example embodiment, if the non-prime carrier 602 is an unsynchronized non-prime carrier, subframe timing of the non-prime carrier 602 may be provided by a second synchronization signal received on the non-prime carrier 602. According to some of the various aspects of embodiments, if synchronization signals are received on a non-prime carrier 602, radio resources 712 of synchronization signal may be in a different time location in the same subframe 708 (as shown in FIG. 6) or in a different subframe (not shown in FIG. 6). The first plurality of data packets and the second plurality of data packets may be received using a plurality of physical resource blocks.

Legacy release 8 and 9 LTE wireless devices may be able to connect to a prime carrier 601. Legacy release 8 and 9 LTE wireless devices may not be able to connect to non-prime carriers. Wireless devices employing an example embodiment may be able to connect to a prime carrier 601, and then employ a non-prime carrier 602 to further enhance the data transmission rate. The initial connection may be set up employing a prime carrier. A wireless device may receive a paging message on a prime carrier. A wireless device may start a random access procedure in the uplink carrier corresponding to a prime downlink carrier to establish a connection. Signaling radio bearer one in LTE may be established using a prime downlink carrier and a corresponding prime uplink carrier. The wireless device may establish other signaling and data radio bearers on a prime carrier, a non-prime carrier, and/or both.

According to some of the various aspects of embodiments, a base station may transmit in a frame in the sequential series of frames on a prime carrier the n most significant bits of a system frame number. The base station may transmit the n most significant bits of a system frame number employing a plurality of subcarriers substantially in the center of the frequency band of the prime carrier on the first subframe of the frame in an information element in a control block transmitted on a physical broadcast channel. Each frame in the sequential series of frames may be assigned a system frame number. The system frame number may be represented by m bits. The base station may transmit the (m−n) least significant bits of the system frame number implicitly by encoding control blocks in the physical broadcast channel over $2^{(m-n)}$ frames (2 to the power of m−n). Sequential position of the encoded control blocks may determine the (m−n) least significant bits. In other word, the timing of the encoded control blocks on the physical broadcast channel may determine the m−n least significant bits. The base station may transmit the same system frame number in frames of the at least one prime carrier if the frames are transmitted at the same time.

The base station may transmit and receive, by employing a communication interface, a first plurality of packets in the frame on a prime carrier. The communication interface may employ, at least in part, the system frame number transmitted in the frame of the prime carrier. The prime carrier may be configured to operate broadcasting the system frame number on the prime carrier. The base station may transmit and receive, by employing a communication interface, a second plurality of packets in the frame on a non-prime carrier. The communication interface may employ, at least in part, the system frame number transmitted in the frame of the prime carrier. The non-prime carrier may be configured to operate without broadcasting the system frame number on the non-prime carrier.

The physical broadcast channel received on a prime carrier may comprise downlink bandwidth, system frame number, and/or PHICH configuration of the prime carrier. According to some of the various aspects of embodiments, n may be equal to 8, and m may be equal to 10. The wireless device may descramble the control blocks received on the physical broadcast channel with a cell-specific sequence prior to modulation. The wireless device may demodulate the control blocks received on the physical broadcast channel using QPSK modulation. The wireless device may decode the control blocks transmitted on the physical broadcast channel employing tail biting convolutional decoding. The receiver may remove CRC bits from a decoded control block of the physical broadcast channel. The CRC bits may be descrambled according to the base station transmit antenna configuration. The wireless device may receive a plurality of control packets on the second data channel. Integrity checksum may be calculated for the plurality of control packets using a plurality of parameters comprising a hyper frame number.

According to some of the various aspects of embodiments, downlink assignments transmitted on the PDCCH may indicate if there is a transmission on a downlink shared channel for a particular wireless device and/or may provide the relevant hybrid ARQ information. For configured downlink assignments, the hybrid ARQ process identifier associated with the subframe may be derived, at least in part, as a function of transmission time interval number. The transmission time interval number may be derived as (system frame number×10)+subframe number. When a wireless device needs to read broadcast control channel, the wireless device may employ the system frame number for decoding.

Figure 9:
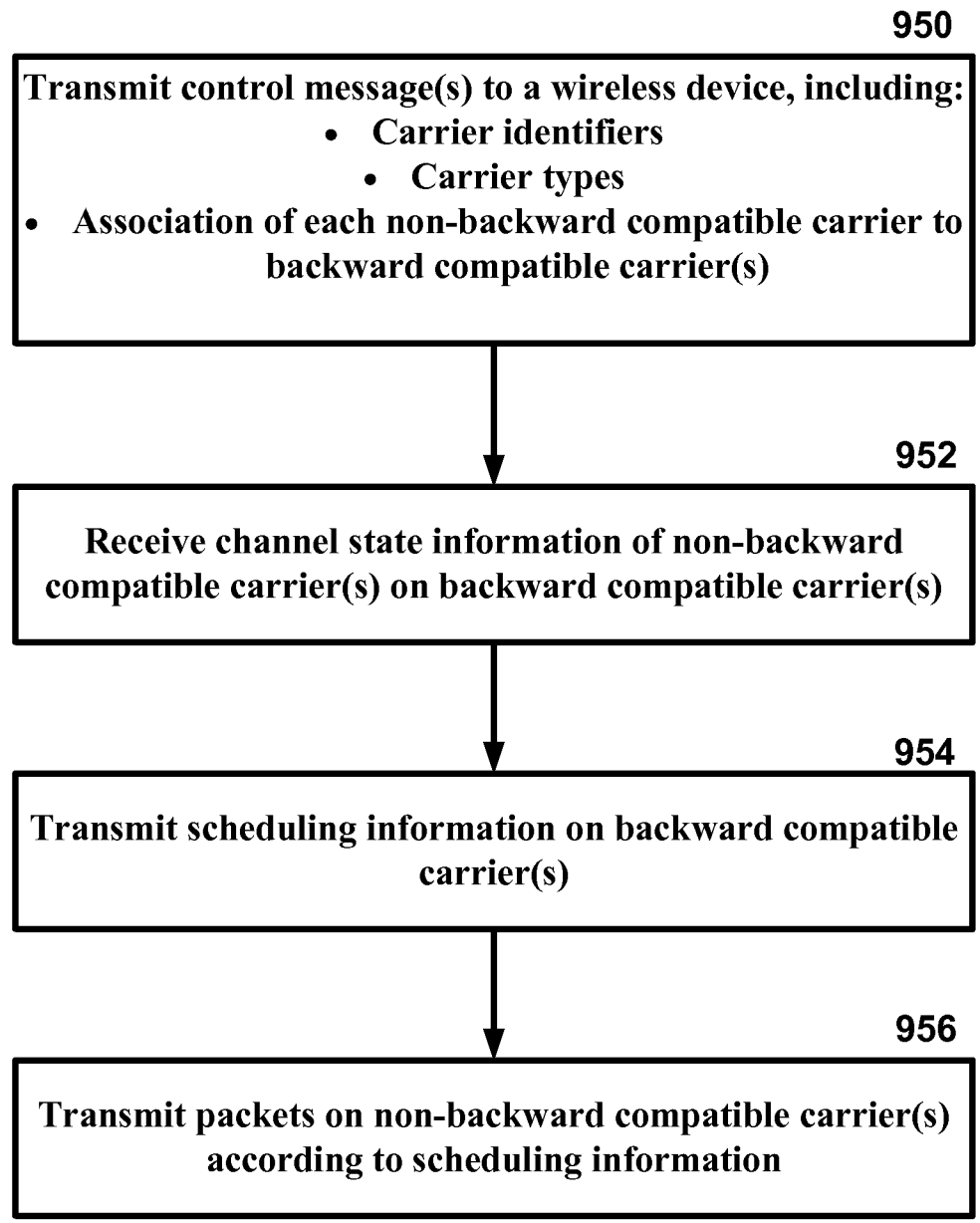
FIG. 9 is an example flow chart for configuration of non-backward compatible carriers as per an aspect of an embodiment of the present invention.

FIG. 9 is an example flow chart for configuration of non-backward compatible carriers as per an aspect of an embodiment of the present invention. According to some of the various aspects of embodiments, a base station may transmit at least one control message to a wireless device (as shown in 950). The at least one control message may comprise an identifier for each carrier in a plurality of carriers and information identifying a carrier type for each carrier in the plurality of carriers. The base station may include other carriers besides the plurality of carriers. The carriers that are not configured using the method described here may not be considered as a subset of the plurality of carriers. For example, the base station may include second carriers employing different technologies not compatible with the disclosed method. The second carriers may not be considered a subset of the plurality of carriers. The plurality of carriers may comprise at least one backward compatible carrier and at least one non-backward compatible carrier. The carrier type may be one of backward compatible carrier type and non-backward compatible carrier type. The first base station may transmit a plurality of packets to the wireless device on the at least one non-backward compatible carrier and the at least one backward compatible carrier. FIG. 5, FIG. 6, FIG. 7 and FIG. 8 illustrate some examples of a backward compatible carrier (equally called a prime carrier) and a non-backward compatible carrier (equally called a non-prime carrier).

According to some of the various aspects of embodiments, a first common reference signal overhead of each of the at least one non-backward compatible carrier may be substantially lower than a second common reference signal overhead of each of the at least one backward compatible carrier. For example, backward compatible carriers may transmit common reference signal only in a limited region of OFDM resources, for example in a limited frequency band, or a part of a subframe. Other embodiments, for example, transmitting common reference signals only on a subset of subframes may be implemented. In another example, the first common reference signal overhead may be substantially lower than the second common reference signal overhead at least in some of the subframes. The term substantially lower implies that the non-backward compatible carriers are designed and operate having a lower common reference signal overhead to increase spectral efficiency.

The at least one control message may further comprise information associating each of the at least one non-backward compatible carrier with one of the at least one backward compatible carrier. The base station may transmit a plurality of control messages to the wireless device on a backward compatible carrier as shown in 954. The plurality of control messages may comprise scheduling information for transmission of packets on a non-backward compatible carrier associated with the backward compatible carrier. The plurality of control messages may be PDCCH control messages. The base station may transmit a plurality of packets to the wireless device on the non-backward compatible carrier according to the scheduling information as shown in 956. The base station may receive channel state information of one of the at least one non-backward compatible carrier from the wireless device on an uplink carrier of one of the at least one backward compatible carrier as shown in 952. Channel state information may be received for carriers that are activated. Base station may not receive channel state information for inactive carriers to reduce uplink overhead and/or wireless device processing requirements. Scheduling information is includes modulation and coding information, which is configured at least in part based on channel state information received from the base station.

According to some of the various aspects of embodiments, a wireless device may receive at least one control message from a first base station. The at least one control message may comprise an identifier for each carrier in the plurality of carriers and information identifying a carrier type for each carrier in the plurality of carriers. The plurality of carriers may comprise at least one backward compatible carrier, and at least one non-backward compatible carrier. The carrier type may be one of backward compatible carrier type and non-backward compatible carrier type. The wireless device may receive a plurality of packets from the first base station on the at least one non-backward compatible carrier and the at least one backward compatible carrier.

According to some of the various aspects of embodiments, the wireless device may receive a plurality of control messages from the first base station on a backward compatible carrier. The plurality of control messages may comprise scheduling information for reception and/or transmission of packets on a non-backward compatible carrier associated with the backward compatible carrier. The wireless device may receive and/or transmit a plurality of packets from/to the first base station on the non-backward compatible carrier according to the scheduling information.

According to some of the various aspects of embodiments, the wireless device may transmit channel state information of one of the at least one non-backward compatible carrier to the first base station on an uplink carrier of one of the at least one backward compatible carrier. In an example implementation, the one non-backward compatible carrier may be associated with the one backward compatible carrier. Channel state information may be transmitted only for activated carriers.

According to some of the various aspects of embodiments, the control message may be encrypted and may be protected by an integrity header before it is transmitted. The control message may be transmitted by employing RRC protocol. The control message may further include configuration information for physical channels for the wireless device. The control message may set up or modify at least one radio bearer. The control message may modify configuration of at least one parameter of a MAC layer or a physical layer. The control message may configure at least one of a physical layer parameter, a MAC layer parameter and an RLC layer parameter. The control message may be an RRC connection reconfiguration message. Broadcast system information messages may be broadcasted on at least one of the at least one backward compatible carrier. The control message comprises radio link configuration information comprising measurement configuration. The control message may comprise radio link configuration information comprising uplink channel configuration. The control message may comprise radio link configuration information comprising handover parameters.

According to some of the various aspects of embodiments, the base station may receive an RRC reconfiguration complete message from the wireless device. The RRC reconfiguration complete message may indicate that the control message is successfully processed by the wireless device. The RRC reconfiguration complete message may include an RRC transaction identifier. The RRC reconfiguration message and RRC reconfiguration complete message may be encrypted and may be protected by an integrity header before being transmitted. The control message may be an RRC Connection Reconfiguration message in LTE-advanced technology. The control message may modify an RRC connection. The control message may include an RRC transaction identifier. The control message may be an RRC connection set up message. The wireless device may transmit a response message after it receives the control message. The response message may include a preferred PLMN ID.

The control message may configure the signal quality metric that the wireless device measures. The control message may configure measurement reporting criteria. The control message may configure cross carrier scheduling configuration. The cross carrier scheduling configuration may associate one non-backward compatible carrier in the at least one non-backward compatible carrier with a backward compatible carrier in the at least one backward compatible carrier.

According to some of the various aspects of embodiments, the control message may comprise physical channel configuration, the physical channel configuration may comprise cross carrier scheduling configuration. The control message may comprise radio resource configuration. The radio resource configuration may comprise physical channel configuration. The carrier identifier may a carrier index. There may be multiple alternatives for reference signal transmission. The common reference signal may not transmitted on the at least one non-backward compatible carrier. The common reference signal may be transmitted in a pre-configured subset of the subframes on the at least one non-backward compatible carrier. The common reference signal may be transmitted in PDCCH radio resource on the at least one non-backward compatible carrier. The common reference signal may be transmitted on the at least one non-backward compatible carrier. CSI reference signal may be transmitted on the at least one non-backward compatible carrier. CSI reference signal may be transmitted on the at least one backward compatible carrier. Demodulation reference signal may be transmitted on the at least one non-backward compatible carrier. Demodulation reference signal may be transmitted on the at least one backward compatible carrier.

According to some of the various aspects of embodiments, the base station may transmit a plurality of control messages to the wireless device on a backward compatible carrier. The plurality of control messages may comprise scheduling information for transmission of packets on a non-backward compatible carrier associated with the backward compatible carrier. The base station may transmit a plurality of packets to the wireless device on the non-backward compatible carrier according to the scheduling information. The plurality of control messages may be PDCCH control messages. One of the at least one backward compatible carrier may be a primary cell carrier for the wireless device. The channel state information may comprise at least CQI information, and/or rank indicator information, and/or precoding matrix indicator information. The format of the channel state information may be configured by the control message.

According to some of the various aspects of embodiments, base stations in a wireless network may be directly or indirectly connected to each other to exchange signaling and data packets. This interface in LTE and LTE-Advanced may be called X2 interface. Other embodiment of the interface may also possible, for example using S1 interface. The X2 user plane interface (X2-U) may be defined between base stations. The X2-U interface may provide non-guaranteed delivery of user plane PDUs. The transport network layer may be built on IP transport and GTP-U may be used on top of UDP/IP to carry the user plane PDUs. The X2 control plane interface (X2-CP) may be defined between two neighbor base stations. The transport network layer may be built on SCTP on top of IP. The application layer signaling protocol may be referred to as X2-AP (X2 Application Protocol). A single SCTP association per X2-C interface instance may be used with one pair of stream identifiers for X2-C common procedures. A few pairs of stream identifiers may be used for X2-C dedicated procedures. The list of functions on interface between the base stations may include the following: mobility support, load management, inter-cell interference coordination, and data exchange.

In order to establish an association between two base stations, a first base station sends a first message to a second base station to initiate an association between two endpoints. The first initiation message may comprise the following parameters: Initiate tag, advertised receiver window credit, number of outbound streams, number of inbound streams, and an initial transmit sequence number.

Initiation Tag may be a 32-bits unsigned integer. The receiver of the initiation message (the responding end) may record the value of the initiate tag parameter. This value may be placed into the verification tag field of every SCTP packet that the receiver of the initiation message transmits within this association. The initiation tag may be allowed to have any value except zero.

Advertised receiver window credit may be thirty-two bits unsigned integer. This value may represent the dedicated buffer space, in terms of the number of bytes, the sender of the initiation message may be reserved in association with this window. During the life of the association, this buffer space may not be lessened (e.g., dedicated buffers taken away from this association); however, an endpoint may change the value of window credit it sends in a packet. Number of outbound streams may be sixteen bits unsigned integer. It may define the number of outbound streams the sender of this initiation message wishes to create in this association. Number of inbound streams may be sixteen bits unsigned integer. It may define the maximum number of streams the sender of this initiation message may allow the peer end to create in this association. There may be no negotiation of the actual number of streams but instead the two endpoints may use the minimum of requested and offered parameters. Initial transmit sequence number may be thirty-two bits unsigned integer. Initial transmit sequence number may define the initial transmit sequence number that the sender may use. This field may be set to the value of the initiate tag field.

According to some of the various aspects of embodiments, the second base station may transmit an initiation acknowledgement message to acknowledge the initiation of an SCTP association with the first base station. The parameter part of the initiation acknowledgement message may be formatted similarly to the initiation message. The parameter part may use two extra variable parameters: The state cookie and the unrecognized parameter. Initiate tag may be a thirty-two bits unsigned integer. The receiver of the initiation acknowledgement message may record the value of the initiate tag parameter. This value may be placed into the verification tag field of every SCTP packet that the initiation acknowledgement message receiver transmits within this association. Advertised receiver window credit may be a thirty-two bits unsigned integer. This value may represent the dedicated buffer space, in terms of the number of bytes, the sender of the initiation acknowledgement message has reserved in association with this window. During the life of the association, this buffer space may not be lessened (e.g., dedicated buffers taken away from this association).

According to some of the various aspects of embodiments, number of outbound streams may be represented by sixteen bits unsigned integer. Number of outbound streams may define the number of outbound streams the sender of this initiation acknowledgement message wishes to create in this association. Number of inbound streams may be a represented in terms of sixteen bits unsigned integer. It may define the maximum number of streams the sender of this initiation acknowledgement message allows the peer end to create in this association. There may not be negotiation of the actual number of streams but instead the two endpoints may use the minimum of requested and offered parameters. Initial transmit sequence number (TSN) may be a represented by thirty-two bits unsigned integer. Initial transmit sequence number (TSN) may define the initial TSN that the initiation acknowledgement message sender may use. This field may be set to the value of the initiate tag field. The state cookie parameter may contain the needed state and parameter information required for the sender of this initiation acknowledgement message to create the association, along with a message authentication code (MAC). Unrecognized parameter may be returned to the originator of the initiation message when the initiation message contains an unrecognized parameter that has a value that indicates it should be reported to the sender. This parameter value field may contain unrecognized parameters copied from the initiation message complete with parameter type, length, and value fields.

According to some of the various aspects of embodiments, when sending an initiation acknowledgement message as a response to an initiation message, the sender of initiation acknowledgement message may create a state cookie and sends it in the state cookie parameter of the initiation acknowledgement message. Inside this state cookie, the sender may include a message authentication code, a timestamp on when the state cookie is created, and the lifespan of the state cookie, along with the information needed for it to establish the association. The following steps may be taken to generate the state cookie: 1) create an association transmission control block (TCB) using information from both the received initiation and the outgoing initiation acknowledgement messages, 2) In the TCB, set the creation time to the current time of day, and the lifespan to the protocol parameter to a pre-determined number, 3) From the TCB, identify and collect the minimal subset of information needed to re-create the TCB, and generate a MAC using this subset of information and a secret key, and/or 4) Generate the state cookie by combining this subset of information and the resultant MAC.

After sending the initiation acknowledgement with the state cookie parameter, the sender may delete the TCB and any other local resource related to the new association, so as to prevent resource attacks. The hashing method used to generate the MAC is strictly a private matter for the receiver of the initiation message. The use of a MAC is used to prevent denial-of-service attacks. The secret key may be random. It may be changed reasonably frequently, and the timestamp in the state cookie may be used to determine which key should be used to verify the MAC. An implementation may make the cookie as small as possible to ensure interoperability.

According to some of the various aspects of embodiments, the first base station may transmit at least one third message to the second base station. One of the at least one third message may be cookie-echo message. The cookie-echo message may be used during the initialization of an association. It may be sent by the initiator of an association to its peer to complete the initialization process. This message may precede any transport packet message sent within the association, but may be bundled with one or more data transport packet in the same packet. This message may contain the exact cookie received in the state cookie parameter from the previous initiation acknowledgement message. The type and flags of the cookie-echo may be different than the cookie parameter. An implementation may make the cookie as small as possible to ensure interoperability. A cookie echo may not contain a state cookie parameter, instead, the data within the state cookie's parameter value becomes the data within the cookie echo's chunk value. This may allow an implementation to change the first two bytes of the state cookie parameter to become a cookie echo message. The first base station may transmit at least one application protocol message in cookie echo message. Or the base station may choose to transmit application protocol messages after the association is complete and do not include application protocol messages in cookie-echo message. This is an implementation option.

The application protocol message may receive a cookie-ack message from the second base station. This message may be used during the initialization of an association. It may be used to acknowledge the receipt of a cookie-echo message. This message may precede any data sent within the association, but may be bundled with one or more data packets in the same SCTP packet. The second base station may transmit at least one application protocol message in cookie ack message. Or the base station may choose to transmit application protocol messages after the association is complete and may not include application protocol messages in cookie-ack message. This could be an implementation option.

After the initiation and initiation acknowledgement messages are transmitted, the first base station or the second base station may transmit an X2 setup message to set up an X2 application interface. The first base station or the second base station may wait until the association is complete to set up an X2 application interface. Either first base station or second base station could start the set up of an X2 application. The purpose of the X2 setup procedure could be to exchange application level configuration data needed for two base stations to interoperate correctly over the X2 interface. This procedure may erase any existing application level configuration data in the two nodes and replace it by the one received. This procedure may also reset the X2 interface like a reset procedure would do.

A first base station or second base station may initiate the procedure by sending the X2 set up request message to a candidate base station. The candidate base station may reply with the X2 set up response message. The initiating base station may transfer the list of served cells. The candidate base station may reply with the complete list of its served cells in the reply.

According to some of the various aspects of embodiments, the X2 set up request message may include the following information about the originator of the message: a global base station identifier, the information about the served cells, and a GU group identifier list. GU Group identifier list is the pools to which the base station belongs to. Each row in this list may include the PLMN ID and MME group Identifier. The information about each served cell may include information about the served cell configurations. It may also include the list of neighbor cells of the served cell including: Cell global identifier of the neighbor cell, Physical cell identifier of the neighbor cell, and frequency. The served cell information may include at least one of the following parameters: Physical cell ID, global cell identifier, tracking area code, at least one broadcast PLMN, FDD information (uplink and downlink frequencies, uplink and downlink transmission bandwidth), TDD information (transmission frequency, subframe assignment, special subframe information, special subframe pattern, cyclic prefix for downlink and uplink), number of antenna ports, PRACH configuration, MBSFN subframe info (radio frame allocation period, radio frame allocation offset, subframe allocation), and CSG identifier. The X2 set up request message may also include information identifying the served cell downlink or/and uplink carrier type. This information may be included explicitly or implicitly in the served cell configuration. The carrier type here could be a first, second, or third carrier type. For example, carrier type may be broadly identified as backward compatible carrier and non-backward compatible carriers. In other example embodiment, the categorization may be different. Each served cell includes a downlink carrier. The carrier types may be called using various names such as data carriers, data cells, control carriers, control cells, primary cells, primary carriers, secondary cells, secondary carriers, or other example names. Each cell includes a downlink carrier and may or may not include an uplink carrier. A cell type may implicitly indicate a carrier type in some example embodiments. The backward compatible and non-backward compatible may be functional characteristics of the carriers and may not be reflected in the carrier types names. The carrier type may not be explicitly indicated in the messages, but this information may be implicitly obtained from the messages. For example, an X2 set up request, may identify cell types A, B, C, and D. Cell type A, B, and C may include backward compatible carrier(s), and cell type D may include non-backward compatible carrier(s). The information about which carrier is backward compatible and which carrier is not backward compatible may be implicitly determined based on the definition of cell types A, B, C, and D. For example, a backward compatible carrier may be used by all wireless devices of release 10 and beyond. But a non-backward compatible carrier may be used by wireless devices of release 11 and beyond.

X2 set up response messages may include most or all of the fields of the X2 set up request message characterizing the base station that is transmitting the message. After two base stations exchange X2 set up request and response message, base stations may be aware of the other base station configurations including information about its serving cells. This information may be used to perform various functions performed by X2 interface including handover signaling and management, load management, and interference coordination.

According to some of the various aspects of embodiments, a first base station may receive a second application protocol message from a second base station in the plurality of base stations. The second application protocol message may comprise at least one of the following: an identifier of the second base station, at least one MME group identifier, cell identifier for each of the at least one backward compatible carrier, and/or information identifying a carrier type for each carrier in the plurality of carriers. The carrier type may be one of at least a first carrier type and a second carrier type. The second base station may comprise a plurality of carriers comprising at least one backward compatible carrier, and at least one non-backward compatible carrier. A first common reference signal overhead of each of the at least one non-backward compatible carrier may be substantially lower than a second common reference signal overhead of each of the at least one backward compatible carrier. The carrier type may be one of backward compatible carrier type and non-backward compatible carrier type. The first base station may operate a wireless device handover based, at least in part, on information in the second application protocol message. The information in the second application protocol may be used to make a handover decision and/or to prepare the wireless device for handover. For example, the information in the second application protocol may be used by the first base station to communicate with the second base station. The first base station may also use the information to decide whether the first base station should initiate a handover to the second base station. Some other parameters, such as cell identifiers and MME identifiers may be used by the first base station to analyze the measurement information received from the UE.

According to some of the various aspects of embodiments, the application protocol messages communicated between two neighboring base stations may exchange application level configuration data needed for two base stations to interoperate correctly over the X2 interface. A handover between two neighboring base stations may not take place, before the base stations exchange first and second application protocol messages. Information in the first and second application protocol messages may be used by a base station for making a handover decision. For example, neighbor information, cell information, carrier information, physical configurations, and/or the like may be used by a first base station to handover a wireless device to a second base station. In an example embodiment, the first base station may consider information related to non-backward compatible and backward compatible carriers to handover a legacy wireless device to a base station with a higher number of backward compatible carriers. In another example, the first base station may handover a release 11 wireless device to a base station with higher number of non-backward compatible carriers. Various implementation specific alternatives may be implemented to employ the information in application protocol messages to enhance handover mechanism.

Figure 10:
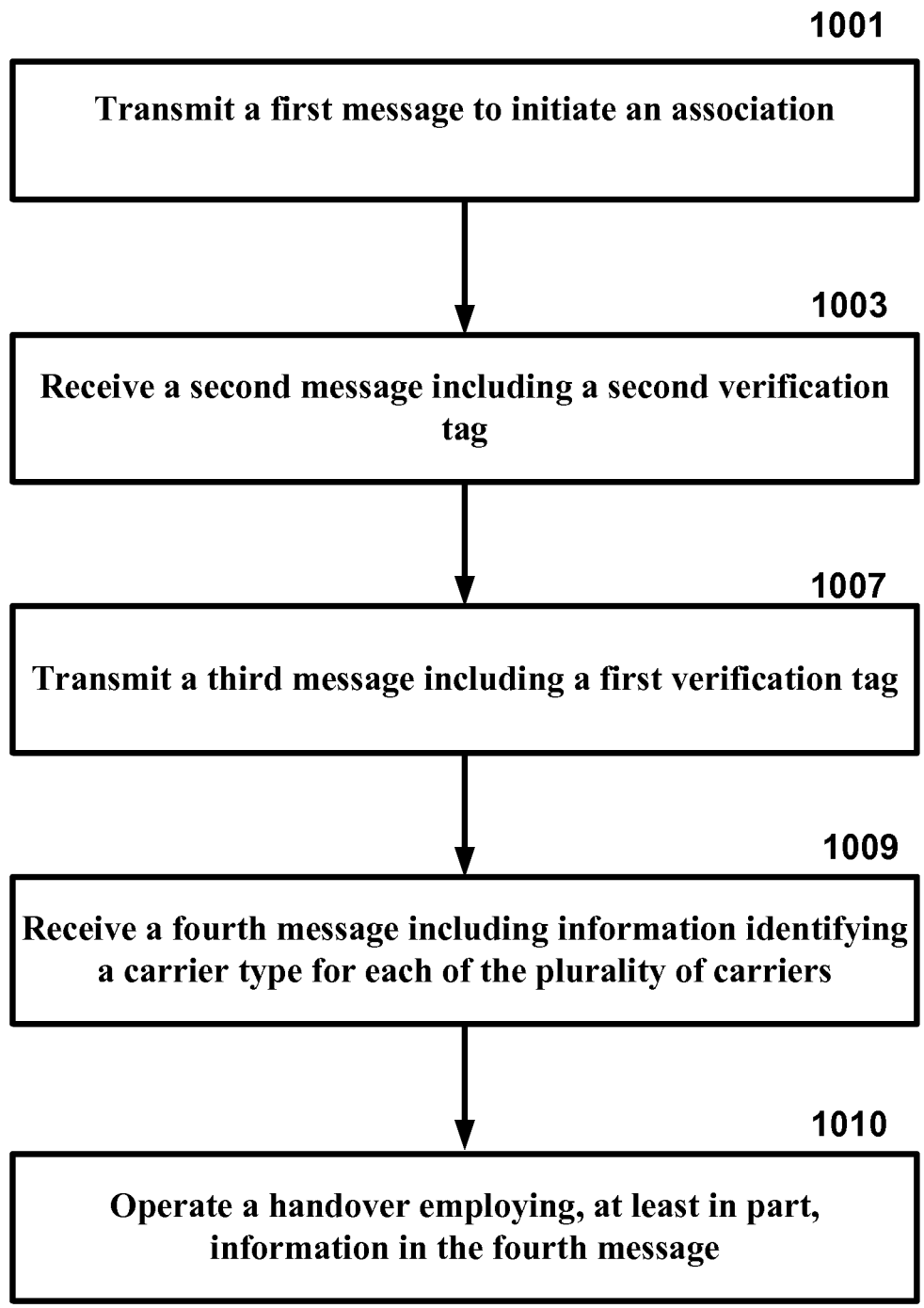
FIG. 10 is an example flow chart showing communications between two neighboring base stations including non-backward compatible carriers as per an aspect of an embodiment of the present invention.

FIG. 10 is an example flow chart showing communications between two neighboring base stations including non-backward compatible carriers as per an aspect of an embodiment of the present invention. According to some of the various aspects of embodiments, a first base station may transmit a first message to initiate an association between the first base station and a second base station in the plurality of base stations as shown in 1001. The first message may comprise a first initiation tag. The first base station may receive a second message from the second base station as shown in 1003. The second message may comprise a second verification tag, a second initiation tag, and a first state parameter. The second verification tag may be equal to the first initiation tag. A first state parameter may comprise at least one parameter related to operational information of the association, and a message authentication code generated as a function of a private key. The first base station may transmit at least one third message to the second base station as shown in 1007. The at least one third message may comprise a first verification tag, and a parameter comprising the first state parameter. The first verification tag may be equal to the second initiation tag. The first base station may receive at least one fourth message from the second base station as shown in 1009. The at least one fourth message may comprise an acknowledgement for the receipt of the parameter and a second application protocol message. The second application protocol message may comprise an identifier of the second base station, at least one MME group identifier, cell identifier for each of the at least one backward compatible carrier, and information identifying a carrier type for each carrier in the plurality of carriers. The second base station may comprise a plurality of carriers comprising at least one backward compatible carrier and at least one non-backward compatible carrier. A first common reference signal overhead of each of the at least one non-backward compatible carrier may be lower than a second common reference signal overhead of each of the at least one backward compatible carrier. The carrier type may be one of backward compatible carrier type and non-backward compatible carrier type. The first base station may operate a wireless device handover using the association and/or based, at least in part, on information in the at least one fourth message as shown in 1010.

According to some of the various aspects of embodiments, the first initiation tag value may be a selected in the first base station using a pseudo-random process. The second initiation tag value may be selected in the second base station using a pseudo-random process. The first message may further comprise a first base station transport address and a second base station transport address. The first message may further comprise a first advertised receiver window credit representing a dedicated buffer space that the first base station reserves for a window of received packets from the second base station. The first message may further comprise a first initial transmission sequence number that the first base station uses for transmission of data segments. The first initial transmission sequence number may be equal to the first initiation tag.

The second message may further comprise the first base station transport address and the second base station transport address. The second message may further comprise a second advertised receiver window credit representing a dedicated buffer space that the second base station reserves for a window of received packets from the first base station. The second message may further comprise a second initial transmission sequence number that the second base station uses for transmission of data chunks. The second initial transmission sequence number may be equal to the second initiation tag. The at least one third message may further comprise the first base station transport address and the second base station transport address. The at least one third message may further comprise a transmit sequence number, a stream identifier, a stream sequence number.

The at least one fourth message may further comprise a transmit sequence number, a stream identifier, and a stream sequence number. The second base station may place the first initiation tag in the verification tag of every transport layer packet that it transmits to the first base station within the association. The first base station may place the second initiation tag in the verification tag of every SCTP packet that it transmits to the second base station within the association. The association may be an SCTP association. The at least one fourth message may further comprise the first base station transport address and the second base station transport address. The second application protocol message may be an X2-Application Protocol Setup Request message. The second application protocol message may be an X2-Application Protocol Setup Response message. The at least one third message may further comprise an X2-Application Protocol Setup Request message. The at least one third message may further comprise an X2-Application Protocol Setup Response message.

The first state parameter may further comprise a timestamp on when the first state parameter is created. The first state parameter may further comprise the lifespan of the first state parameter. The message authentication code may further be a function of at least one parameter related to operational information of the association. The at least one third message may further comprise a first application protocol message. The first application protocol message may comprise a identifier of the first base station, at least one MME group identifier, cell identifier for each of the at least one backward compatible carrier, information identifying a carrier type for each carrier in the plurality of carriers. The first base station may comprise a plurality of carriers comprising at least one backward compatible carrier and at least one non-backward compatible carrier. The carrier type may be one of backward compatible and non-backward compatible.

The first verification tag and the second verification tag in the association may not change during the life time of the association. A new verification tag value may be used each time the first base station or the second base station tears down and then reestablishes an association with the same node. The operational information comprises at least one of the following: a parameter in the first message, a parameter in the second message, a state of the association, a configuration parameter of the first base station, and a configuration parameter of the second base station. The first message and the second message may further comprise a checksum for packet validation. The first base station transport address and the second base station transport address may comprise an IP address and a port address. The second application protocol message may further comprise cell identifier for each of the at least one non-backward compatible carrier. The second application protocol message may further comprise information identifying for each of the at least one non-backward compatible carrier, a corresponding backward compatible carrier.

There may be various alternative options for transmitting reference signal on downlink carriers. The at least one backward compatible carrier may broadcast a common cell reference signal and the at least one non-backward compatible carrier may not broadcast the common cell reference signal. The common reference signal may not be transmitted on the at least one non-backward compatible carrier. The common reference signal may be transmitted in a pre-configured subset of the subframes on the at least one non-backward compatible carrier. The common reference signal may be transmitted in PDCCH radio resource on the at least one non-backward compatible carrier. The common reference signal may be transmitted on the at least one non-backward compatible carrier. A base station may transmit a common reference signal on a pre-configured OFDM resource region of the at least one non-backward compatible carrier.

CSI reference signal may be transmitted on the at least one non-backward compatible carrier. CSI reference signal may be transmitted on the at least one backward compatible carrier. Demodulation reference signal may be transmitted on the at least one non-backward compatible carrier. Demodulation reference signal maybe transmitted on the at least one backward compatible carrier.

The first message may further comprise a first number of outbound streams that the first base station intend to create and a first maximum number of inbound streams that the first base station allows the second base station to create. The second message may further comprise a second number of outbound streams that the second base station intend to create, a second maximum number of inbound streams the second base station allows the first base station to create. The second number of outbound streams is smaller than or equal to the first maximum number of inbound streams. The first base station may further select a number equal or lower than the minimum of the first number of outbound streams and the second maximum number of inbound streams as the number of outbound streams for the first base station.

Embodiments of the present invention enable the intelligent transfer of a wireless device between base stations that accounts for devices that have both backward and non-backward compatible carrier configurations. An issue with respect to non-backward compatible carrier configurations is the maintenance and updating of carrier configurations during a wireless device handover from a serving base station to a target base station. A wireless device may be configured with a first carrier configuration with a serving base station. A target base station may maintain the same non-backward compatible carrier configuration, or may direct the updating of a wireless device's non-backward compatible carrier configuration. There is a need for developing a signalling flow, wireless device processes, and base station processes to address wireless device non-backward compatible carrier configurations during a handover to reduce handover overhead and handover delay.

According to some of the various aspects of embodiments, in connected mode, the network may control wireless device mobility. For example, the network may decide when and to which base station the wireless device connects. For network controlled mobility in connected mode, a primary carrier may be changed using an RRC connection reconfiguration message that includes mobility control information (handover). The network may trigger the handover procedure (e.g. based on radio conditions, load, QoS, wireless device category, and/or the like). The network may configure the wireless device to perform measurement reporting. The network may also initiate a handover blindly (e.g. without having received measurement reports from the wireless device). Before sending the handover message to the wireless device, the source base station may prepare one or more target cells. The source base station may select a target primary cell. The source base station may also provide the target base station with a list of best cells on a frequency for which measurement information is available (e.g. in order of decreasing signal strength level). The source base station may also include available measurement information for the cells provided in the list. The target base station may decide which backward compatible carrier(s) and non-backward compatible carrier(s) are configured for use after the handover, which may include cells other than the ones indicated by the source base station.

The target base station may generate a message used to configure backward compatible carrier(s) and non-backward compatible carrier(s) of the wireless device for the handover, for example, the message including carrier configuration parameters to be used in the target base station. The source base station may transparently (e.g., may not alter values/content) forward the handover message/information received from the target base station to the wireless device. After receiving the handover message, the wireless device may attempt to access the target primary cell at the available random access channel resources according to a random access resource selection. Upon successful completion of the handover, the wireless device may send a message used to confirm the handover to the target base station. The wireless device may use the target backward compatible and non-backward compatible carrier configuration received from the source base station in communicating with the target base station.

According to some of the various aspects of embodiments, a base station may consider a wireless device's capability in configuring non-backward compatible carriers for a wireless device. A wireless device may be configured with a configuration that is compatible with the wireless device's capability. Capability to communicate via non-backward compatible carriers may not be supported by wireless devices not compatible with LTE release 11 or above. A wireless device may transmit its capability to a base station via an RRC message. The base station may consider wireless device capability in configuring non-backward compatible carriers for the wireless device.

The wireless device context within the source base station may contain information regarding roaming/handover restrictions which may be provided either at connection establishment or at the last tracking area update process. The source base station may configure the wireless device measurement procedures employing at least one RRC connection reconfiguration message. The wireless device may be triggered to send at least one measurement report by the rules set by, for example: system information, RRC configuration, and/or the like. The source base station may make a handover decision based on many parameters, such as: measurement reports, radio resource configuration information, traffic and load information, a combination of the above, and/or the like. The source base station may initiate the handover procedure by sending a handover request message to one or more potential target base stations.

The source base station may transmit a handover request message to one or more potential target base stations by passing information to prepare the handover at the target side. The handover request message may comprise information indicating the wireless device's capability regarding communication employing non-backward compatible carrier(s) and/or backward compatible carrier(s). The target base station may employ the capability of the wireless device in order to properly configure carrier configuration of the wireless device before the wireless device connects to the target base station. The target base station may configure the wireless device considering the carrier configuration limitations and capabilities of the wireless device. For example, if the wireless device does not support non-backward compatible carriers, or if the wireless device does not support special type(s) of backward compatible carriers or some carrier band combinations, the target base station may avoid trying to configure the wireless device with those carrier configuration options. In another example, if the wireless device does not support non-backward compatible carrier configurations with certain band combinations or synchronization options, the base station may consider this limitation in wireless device carrier configurations. In another example embodiment, handover request messages may further comprise the current backward and non-backward compatible carrier configuration of the wireless device connected to the serving base station. During the handover preparation phase, the serving base station may transmit wireless device's carrier capability and/or wireless device's current carrier configuration (non-backward and backward carrier configuration of the wireless device in connection with the serving base station) to one or more potential target base stations. In an example embodiment, the serving base station may provide information such as, for example, about wireless device dedicated radio resource configurations. This may, for example, include configuration of non-backward compatible carrier parameters, enhanced PDCCH parameters, PDSCH parameters, non-backward compatible physical layer parameters and channel parameters, power control parameters, carrier configuration parameters, frequency information, carrier type, cross carrier scheduling parameters, and/or dedicated MAC configuration parameters, a combination thereof, and/or the like. This information may be employed, at least in part, by the potential target base station to configure the wireless device, for example, to configure multiple carrier configuration parameters.

Handover admission control may be performed by the target base station dependent on many factors (e.g. QoS required for the wireless device bearers, wireless device capabilities, wireless device configuration, target base station load, a combination of the above, and/or the like). The target base station may configure the required resources according to the received information from the serving base station. The radio access configuration to be used in the target carrier may be specified independently (for example as an establishment) or as a delta compared to the radio access configuration used in the source cell (for example as a reconfiguration).

The target base station may prepare a handover and may send a handover request acknowledge message to a source base station. The handover request acknowledge message may include a transparent container to be sent to the wireless device as an RRC message to perform the handover. The container may include a new C-RNTI, target base station security algorithm identifiers for the selected security algorithms, a dedicated RACH preamble, access parameters, SIBs, and/or other configuration parameters. The transparent container may further comprise the backward compatible and non-backward compatible carrier configurations for connection of the wireless device to the target base station. The carrier configurations may modify the carrier configuration of the wireless device or may keep the same carrier configuration that the wireless device has with the serving base station. The target base station may generate the RRC message to perform the handover, for example, the RRC connection reconfiguration message including the mobility control information. The RRC message may be sent by the source base station towards the wireless device. The source base station may perform the necessary integrity protection and ciphering of the message. The wireless device may receive the RRC connection reconfiguration message from the source base station and may start performing the handover.

After receiving the RRC connection reconfiguration message, including the mobility control information, the wireless device may perform synchronization to the target base station and access the target cell via a random access channel on a primary cell. The wireless device may derive target base station specific keys and may configure the selected security algorithms to be used in the target cell. The target base station may respond with uplink allocation and timing advance information. After the wireless device has successfully accessed the target cell, the wireless device may send an RRC connection reconfiguration complete message to confirm the handover and to indicate that the handover procedure is completed for the wireless device. The target base station may now begin sending and receiving data with the wireless device.

Figure 11:
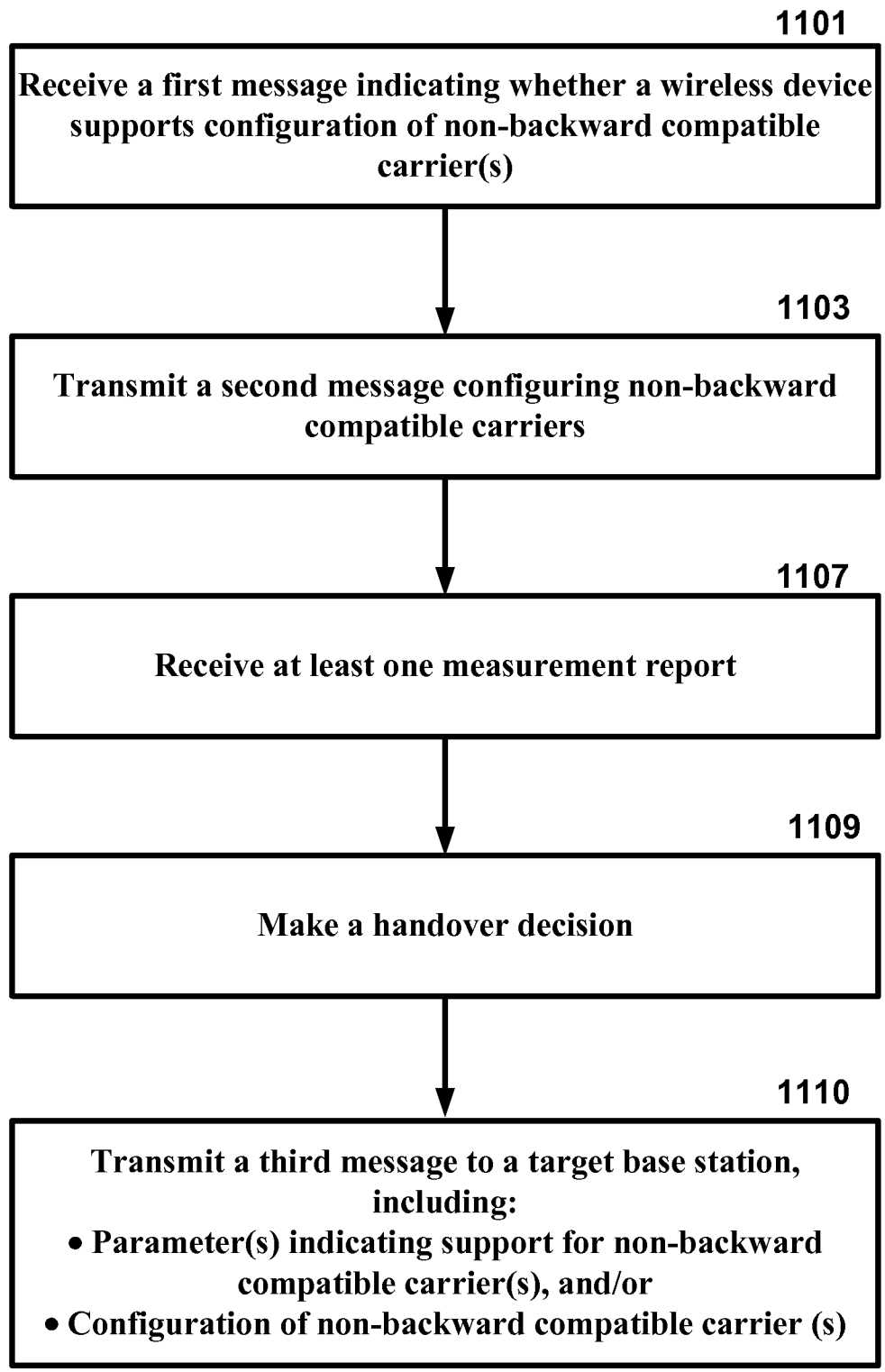
FIG. 11 is an example flow chart for handover between two neighboring base stations including non-backward compatible carriers as per an aspect of an embodiment of the present invention.

FIG. 11 is an example flow chart for handover between two neighbouring base stations including non-backward compatible carriers as per an aspect of an embodiment of the present invention. According to some of the various aspects of embodiments, a serving base station may be configured to communicate employing at least one backward compatible carrier and at least one non-backward compatible carrier. The serving base station may receive a first message from a wireless device on a primary carrier in the at least one backward compatible carrier as shown in 1101. The first message may comprise one or more parameters implicitly or explicitly indicating whether the wireless device supports configuration of one or more non-backward compatible carriers. For example, the first message may include a first parameter that indicates whether the wireless device supports non-backward compatible carrier and/or a second parameter indicating what type of non-backward compatible carrier is supported (e.g. synchronized, unsynchronized, inter-band, intra-band, etc). In another example, the first message may include a parameter indicating the release version of the wireless device, which may implicitly indicate whether the wireless device supports non-backward compatible carrier and/or which type of backward and non-backward compatible carriers are supported. In another example, a parameter may indicate radio capabilities which implicitly or explicitly indicate whether the wireless device supports non-backward compatible carrier and/or which type of backward and non-backward compatible carriers are supported. The specification provides many embodiments of backward compatible and non-backward compatible carriers. In an example embodiment, a first common reference signal overhead of each of the at least one non-backward compatible carrier may be substantially lower than a second common reference signal overhead of each of the at least one backward compatible carrier.

The serving base station may transmit to the wireless device, at least one second message as shown in 1103. At least some of the parameters in the at least one second message may depend at least in part on the first message. For example, if the first message indicates certain capability in the wireless device, the base station may configure those capabilities. In another example, if the first base station indicates certain capabilities are not supported in the wireless device, the base station may not configure those capabilities. For example, if the wireless device does not support inter-band synchronized carriers, the base station may not configure inter-band synchronized carriers for the wireless device. In another example, the base station may transmit the at least one second message to configure non-backward compatibles in the wireless only if the wireless device supports this feature according to the first message. Otherwise. The base station may not configure non-backward compatible carriers in the wireless device.

According to some of the various aspects of embodiments, the at least one second message may comprise at least one of: an identifier for each carrier in the plurality of carriers, information identifying a carrier type for each of the plurality of carriers, and information associating each non-backward compatible carrier in the plurality of carriers with one backward compatible carrier in the plurality of carriers, and/or measurement parameters, and/or a combination of the above. The identifier for each carrier may be a carrier index, and/or a carrier physical cell ID, and/or the like. The plurality of carriers may comprise: at least one of the at least one backward compatible carrier, and at least one of the at least one non-backward compatible carrier. The information identifying a carrier type for each of the plurality of carriers may be in the form of physical layer configuration parameter(s). For example, certain parameters in the physical layer may be configured in a way that it identifies a carrier to be a backward or non-backward compatible carrier. For example, if common reference signal is not transmitted on a carrier, the carrier may be a non-backward compatible carrier. In another example, if enhanced PDCCH is configured for a carrier that carrier may be considered to be a non-backward carrier. Carrier types may not be limited to backward and non-backward carrier types, and other carrier types may also be supported (e.g. synchronized, contiguous, non-synchronized, etc). In one example embodiment, the carrier type may be one of a backward compatible type and non-backward compatible type. Information associating each non-backward compatible carrier in the plurality of carriers with one backward compatible carrier in the plurality of carriers may be in the form of, for example, a backward carrier index in the non-backward carrier configuration parameters. In another example, the association parameters may be included in the cross carrier scheduling configuration parameters. The at least one second message may be configured to cause configuration of a plurality of carriers in the wireless device. The at least one second message may be configured to cause the wireless device measuring signal quality of at least one carrier of at least one target base station in response to the measurement parameters.

According to some of the various aspects of embodiments, the serving base station may receive at least one measurement report from the wireless device in response to the at least one second message as shown in 1107. The at least one measurement report may comprise signal quality information of at least one of the at least one carrier of at least one of the at least one target base station. The signal quality information may be derived at least in part employing measurements of at least one OFDM subcarrier. The serving base station may make a handover decision, based at least in part on the at least one measurement report as shown in 1109. The serving base station may transmit, in response to the serving base station making a handover decision for the wireless device, at least one third message to at least one target base station as shown in 1110. The at least one third message may comprise at least one of: the one or more parameters indicating whether the wireless device supports configuration of one or more non-backward compatible carriers; and configuration information of some of the carriers. The some of the carriers may include the at least one of the at least one backward compatible carrier and/or the at least one of the at least one non-backward compatible carrier.

According to some of the various aspects of embodiments, before the at least one second message is transmitted, the serving base station may encrypt the at least one second message. The serving base station may also protect the at least one second message by an integrity header. The at least one second message may further include configuration information for physical channels for the wireless device. The at least one second message may be configured to cause the wireless device to set up or modify at least one radio bearer. One of the at least one second message may be configured to cause the wireless device to configure at least one of a physical layer parameter, a MAC layer parameter and/or an RLC layer parameter. One of the at least one second message comprises radio link configuration information comprising uplink channel configuration parameters and handover parameters. At least one of the at least one second message may comprise a radio resource configuration comprising a physical channel configuration. The serving base station may transmit a channel state information reference signal on the at least one non-backward compatible carrier and/or the at least one backward compatible carrier. The serving base station may transmit a demodulation reference signal on the at least one non-backward compatible carrier and the at least one backward compatible carrier. A format of the at least one measurement report may be determined employing at least one of the at least one second control message.

Figure 12:
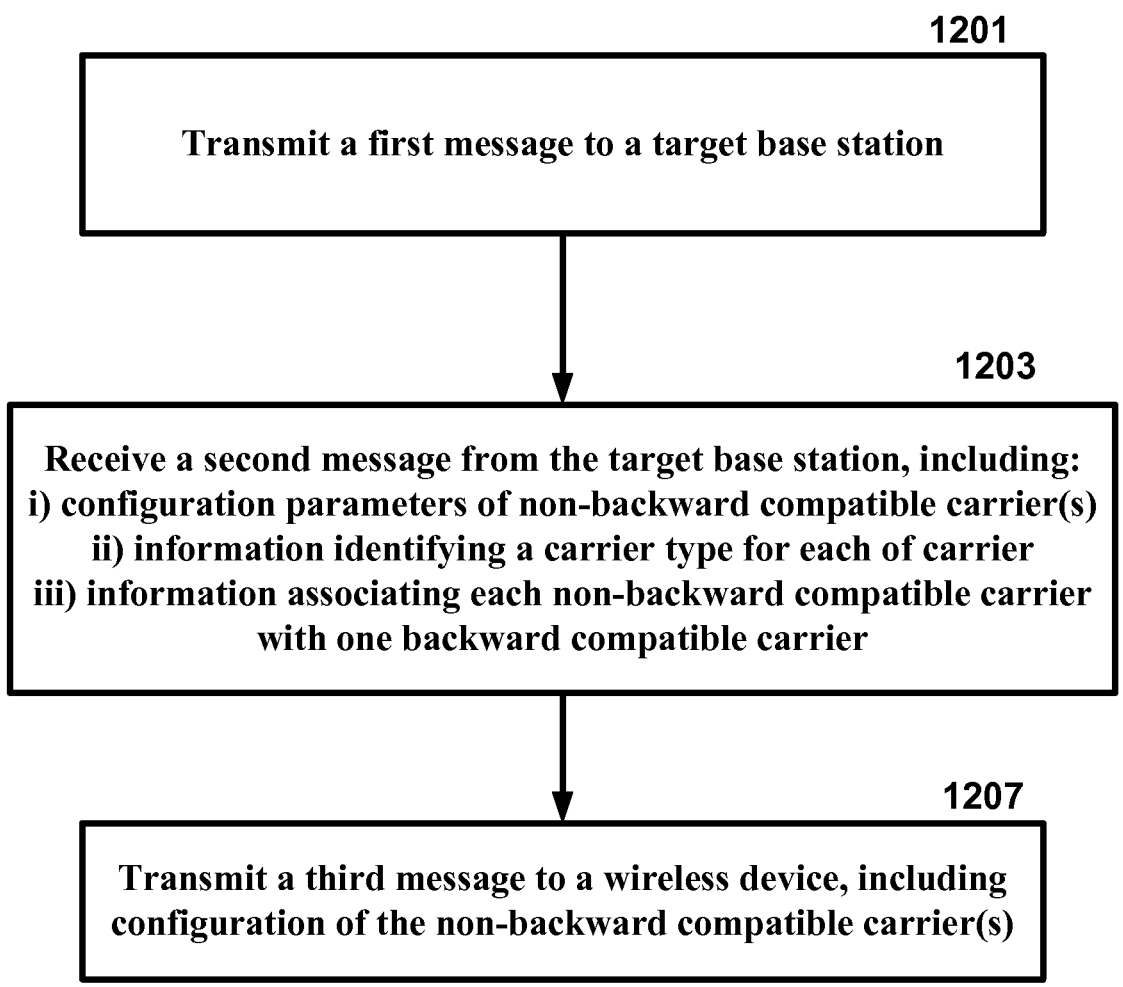
FIG. 12 is an example flow chart for handover between two neighboring base stations including non-backward compatible carriers as per an aspect of an embodiment of the present invention.

FIG. 12 is an example flow chart for handover between two neighbouring base stations including non-backward compatible carriers as per an aspect of an embodiment of the present invention. According to some of the various aspects of embodiments, a cellular network may comprise a serving base station and a target base station. The serving base station may transmit, in response to the serving base station making a handover decision for a wireless device, at least one first message to at least one target base station as shown in 1201. The serving base station may receive, at least one second message from one of the at least one target base station as shown in 1203. The at least one second message may comprise at least one of: configuration parameters of a plurality of carriers for the wireless device, information identifying a carrier type for each of the plurality of carriers, information associating each of the at least one non-backward compatible carrier with one of the at least one backward compatible carrier.

According to some of the various aspects of embodiments, the plurality of carriers may comprise at least one backward compatible carrier and at least one non-backward compatible carrier. Many example embodiments of backward compatible carrier and non-backward compatible carriers are disclosed in the specification. In an example embodiment, a first common reference signal overhead of each of the at least one non-backward compatible carrier may be substantially lower than a second common reference signal overhead of each of the at least one backward compatible carrier. The carrier type may be one of a backward compatible type and non-backward compatible type. The serving base station may transmit, in response to receiving the at least one second message, a third message to the wireless device as shown in 1207. The third message may comprise the configuration information of the at least one backward compatible carrier and/or the at least one non-backward compatible carrier.

Before the third message is transmitted, the serving base station may encrypt the third message. The serving base station may protect the third message by an integrity header. The third message may further include configuration information for physical channels for the wireless device. The third message may be configured to cause the wireless device to set up or modify at least one radio bearer. The third message may be configured to cause the wireless device to configure at least one of a physical layer parameter, a MAC layer parameter and/or an RLC layer parameter.

The third message may comprise radio link configuration information comprising uplink channel configuration parameters and/or handover parameters. The third message may comprise at least one radio resource configuration parameter comprising at least one physical channel configuration parameter. The one of the at least one target base station may transmit a channel state information reference signal on the at least one non-backward compatible carrier and the at least one backward compatible carrier. The one of the at least one target base station may transmit a demodulation reference signal on the at least one non-backward compatible carrier and the at least one backward compatible carrier. The third message may further comprise the information identifying a carrier type for each of the plurality of carriers. The third message may further comprise the information associating each non-backward compatible carrier in the plurality of carriers with one backward compatible carrier in the plurality of carriers.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

The mechanisms described in this disclosure may be implemented in hardware, software in combination with hardware, firmware, wetware (i.e hardware with a biological element) or a combination thereof, all of which are behaviorally equivalent. For example, mechanisms may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

The invention claimed is:

1. A method comprising:
receiving, by a second base station and prior to handover of a wireless device from a first base station, a handover request comprising an indication of at least one carrier type supported by the wireless device;
transmitting, by the second base station, to the first base station, and after receiving the handover request, at least one message comprising configuration information for communications between the wireless device and the second base station, wherein the configuration information comprises:
an identifier of a carrier of a first carrier type; and
an identifier of a carrier of a second carrier type,
wherein the carrier of the first carrier type comprises a reference signal in every downlink subframe of a plurality of downlink subframes, and
wherein the carrier of the second carrier type is without a reference signal in at least one downlink subframe of the plurality of downlink subframes; and
transmitting, by the second base station, to the wireless device, and employing the carrier of the first carrier type and the carrier of the second carrier type, information.

2. The method of claim 1, wherein the carrier of the second carrier type is without the reference signal, in the at least one downlink subframe, based on data being transmitted in fewer than all downlink subframes of the plurality of downlink subframes.

3. The method of claim 1, wherein the carrier of the second carrier type selectively comprises a reference signal based on data being transmitted in one or more of the plurality of downlink subframes.

4. The method of claim 1, wherein the carrier of the second carrier type supports fewer transmission modes than the carrier of the first carrier type.

5. The method of claim 1, wherein the carrier of the second carrier type employs a wireless-device-specific demodulation reference signal.

6. The method of claim 1, further comprising causing a downlink subframe, of the second carrier type, to become empty.

7. The method of claim 1, wherein the carrier of the second carrier type comprises a second downlink subframe in which a control channel is configured to start at a symbol after a first symbol in the second downlink subframe.

8. The method of claim 7, wherein in the second downlink subframe, no reference signal is transmitted between the first symbol in the second downlink subframe and the control channel in the second downlink subframe.

9. The method of claim 1, wherein transmitting the information comprise transmitting at least one of:
data;
configuration; or
a message.

10. A second base station comprising:
one or more processors; and
memory storing instructions that, when executed by the one or more processors, cause the second base station to:
receive, prior to handover of a wireless device from a first base station, a handover request comprising an indication of at least one carrier type supported by the wireless device;
transmit, to the first base station and after receiving the handover request, at least one message comprising configuration information for communications between the wireless device and the second base station, wherein the configuration information comprises:
an identifier of a carrier of a first carrier type; and
an identifier of a carrier of a second carrier type, wherein the carrier of the first carrier type comprises a reference signal in every downlink subframe of a plurality of downlink subframes, and wherein the carrier of the second carrier type is without a reference signal in at least one downlink subframe of the plurality of downlink subframes; and transmit, to the wireless device and employing the carrier of the first carrier type and the carrier of the second carrier type, information.

11. The second base station of claim 10, wherein the carrier of the second carrier type is without the reference signal, in the at least one downlink subframe, based on data being transmitted in fewer than all downlink subframes of the plurality of downlink subframes.

12. The second base station of claim 10, wherein the carrier of the second carrier type selectively comprises a reference signal based on data being transmitted in one or more of the plurality of downlink subframes.

13. The second base station of claim 10, wherein the carrier of the second carrier type supports fewer transmission modes than the carrier of the first carrier type.

14. The second base station of claim 10, wherein the carrier of the second carrier type employs a wireless-device-specific demodulation reference signal.

15. The second base station of claim 10, wherein the instructions, when executed by the one or more processors, further cause a downlink subframe, of the second carrier type, to become empty.

16. The second base station of claim 10, wherein the carrier of the second carrier type comprises a second downlink subframe in which a control channel is configured to start at a symbol after a first symbol in the second downlink subframe.

17. The second base station of claim 16, wherein in the second downlink subframe, no reference signal is transmitted between the first symbol in the second downlink subframe and the control channel in the second downlink subframe.

18. The second base station of claim 10, wherein the instructions, when executed by the one or more processors, cause the second base station to transmit the information by transmitting:
date;
configuration information; or
a message.

19. A system comprising:
a first base station and a second base station,
wherein the first base station comprises:
one or more processors; and
memory storing instructions that, when executed by the one or more processors of the first base station, cause the first base station to transmit a handover request comprising an indication of at least one carrier type supported by a wireless device, and
wherein the second base station comprises:
one or more processors; and
memory storing instructions that, when executed by the one or more processors of the second base station, cause the second base station to:
receive, prior to handover of the wireless device from the first base station, the handover request;
transmit, to the first base station and after receiving the handover request, at least one message comprising configuration information for communications between the wireless device and the second base station, wherein the configuration information comprises:
an identifier of a carrier of a first carrier type; and
an identifier of a carrier of a second carrier type,
wherein the carrier of the first carrier type comprises a reference signal in every downlink subframe of a plurality of downlink subframes, and
wherein the carrier of the second carrier type is without a reference signal in at least one downlink subframe of the plurality of downlink subframes; and
transmit, to the wireless device and employing the carrier of the first carrier type and the carrier of the second carrier type, information.

20. The system of claim 19, wherein the carrier of the second carrier type is without the reference signal, in the at least one downlink subframe, based on data being transmitted in fewer than all downlink subframes of the plurality of downlink subframes.

21. The system of claim 19, wherein the carrier of the second carrier type selectively comprises a reference signal based on data being transmitted in one or more of the plurality of downlink subframes.

22. The system of claim 19, wherein the carrier of the second carrier type supports fewer transmission modes than the carrier of the first carrier type.

23. The system of claim 19, wherein the carrier of the second carrier type employs a wireless-device-specific demodulation reference signal.

24. The system of claim 19, wherein the instructions in the memory of the second base station, when executed by the one or more processors of the second base station, further cause a downlink subframe, of the second carrier type, to become empty.

25. The system of claim 19, wherein the carrier of the second carrier type comprises a second downlink subframe in which a control channel is configured to start at a symbol after a first symbol in the second downlink subframe.

26. The system of claim 25, wherein in the second downlink subframe, no reference signal is transmitted between the first symbol in the second downlink subframe and the control channel in the second downlink subframe.

27. The system of claim 19, wherein the instructions in the memory of the second base station, when executed by the one or more processors of the second base station, cause the second base station to transmit the information by transmitting:
data;
configuration information; or
a message.

28. A method comprising:
transmitting, by a wireless device and to a first base station, a message indicating at least one type of carrier supported by the wireless device;
receiving, from the first base station, configuration information corresponding to a second base station, wherein the configuration information indicates that the second base station supports:
a carrier of a first carrier type; and
a carrier of a second carrier type,
wherein the carrier of the first carrier type comprises a reference signal in every downlink subframe of a plurality of downlink subframes, and wherein the carrier of the second carrier type is without a reference signal in at least one downlink subframe of the plurality of downlink subframes; and communicating with the second base station employing the carrier of the first carrier type and the carrier of the second carrier type.

29. The method of claim 28, wherein the carrier of the second carrier type is without the reference signal, in the at least one downlink subframe, based on data being transmitted in fewer than all downlink subframes of the plurality of downlink subframes.

30. The method of claim 28, wherein the carrier of the second carrier type selectively comprises a reference signal based on data being transmitted in one or more of the plurality of downlink subframes.

31. The method of claim 28, wherein the carrier of the second carrier type supports fewer transmission modes than the carrier of the first carrier type.

32. The method of claim 28, wherein the carrier of the second carrier type employs a wireless-device-specific demodulation reference signal.

33. The method of claim 28, wherein the carrier of the second carrier type comprises a second downlink subframe in which a control channel is configured to start at a symbol after a first symbol in the second downlink subframe.

34. The method of claim 33, wherein in the second downlink subframe, no reference signal is transmitted between the first symbol in the second downlink subframe and the control channel in the second downlink subframe.

35. A wireless device comprising:
one or more processors; and
memory storing instructions that, when executed by the one or more processors, cause the wireless device to:
transmit, to a first base station, a message indicating at least one type of carrier supported by the wireless device;
receive, from the first base station, configuration information corresponding to a second base station, wherein the configuration information indicates that the second base station supports:
a carrier of a first carrier type; and
a carrier of a second carrier type,
wherein the carrier of the first carrier type comprises a reference signal in every downlink subframe of a plurality of downlink subframes, and
wherein the carrier of the second carrier type is without a reference signal in at least one downlink subframe of the plurality of downlink subframes; and
communicate with the second base station employing the carrier of the first carrier type and the carrier of the second carrier type.

36. The wireless device of claim 35, wherein the carrier of the second carrier type is without the reference signal, in the at least one downlink subframe, based on data being transmitted in fewer than all downlink subframes of the plurality of downlink subframes.

37. The wireless device of claim 35, wherein the carrier of the second carrier type selectively comprises a reference signal based on data being transmitted in one or more of the plurality of downlink subframes.

38. The wireless device of claim 35, wherein the carrier of the second carrier type supports fewer transmission modes than the carrier of the first carrier type.

39. The wireless device of claim 35, wherein the carrier of the second carrier type employs a wireless-device-specific demodulation reference signal.

40. The wireless device of claim 35, wherein the carrier of the second carrier type comprises a second downlink subframe in which a control channel is configured to start at a symbol after a first symbol in the second downlink subframe.

41. The wireless device of claim 40, wherein in the second downlink subframe, no reference signal is transmitted between the first symbol in the second downlink subframe and the control channel in the second downlink subframe.

42. A system comprising:
a wireless device and a first base station,
wherein the wireless device comprises:
one or more processors; and
memory storing instructions that, when executed by the one or more processors of the wireless, cause the wireless device to:
transmit, to the first base station, a message indicating at least one type of carrier supported by the wireless device;
receive, from the first base station, configuration information corresponding to a second base station, wherein the configuration information indicates that the second base station supports:
a carrier of a first carrier type; and
a carrier of a second carrier type,
wherein the carrier of the first carrier type comprises a reference signal in every downlink subframe of a plurality of downlink subframes, and
wherein the carrier of the second carrier type is without a reference signal in at least one downlink subframe of the plurality of downlink subframes; and
communicate with the second base station employing the carrier of the first carrier type and the carrier of the second carrier type, and
wherein the first base station comprises:
one or more processors; and
memory storing instructions that, when executed by the one or more processors of the first base station, cause the first base station to receive the message indicating the at least one type of carrier supported by the wireless device.

43. The system of claim 42, wherein the carrier of the second carrier type is without the reference signal, in the at least one downlink subframe, based on data being transmitted in fewer than all downlink subframes of the plurality of downlink subframes.

44. The system of claim 42, wherein the carrier of the second carrier type selectively comprises a reference signal based on data being transmitted in one or more of the plurality of downlink subframes.

45. The system of claim 42, wherein the carrier of the second carrier type supports fewer transmission modes than the carrier of the first carrier type.

46. The system of claim 42, wherein the carrier of the second carrier type employs a wireless-device-specific demodulation reference signal.

47. The system of claim 42, wherein the carrier of the second carrier type comprises a second downlink subframe in which a control channel is configured to start at a symbol after a first symbol in the second downlink subframe.

48. The system of claim 47, wherein in the second downlink subframe, no reference signal is transmitted between the first symbol in the second downlink subframe and the control channel in the second downlink subframe.

* * * * *

UNITED STATES PATENT AND TRADEMARK OFFICE
CERTIFICATE OF CORRECTION

PATENT NO. : 10,568,085 B2
APPLICATION NO. : 15/912080
DATED : February 18, 2020
INVENTOR(S) : Esmael Hejazi Dinan It is certified that error appears in the above-identified patent and that said Letters Patent is hereby corrected as shown below:

In the Specification

Column 41, Detailed Description of Embodiments, Line 23:
Please delete "Lab VIEWMathScript." and insert --LabVIEWMathScript.--

In the Claims

Column 42, Line 47:
In Claim 9, please delete "comprise" and insert --comprises--

Column 42, Line 49:
In Claim 9, please delete "configuration;" and insert --configuration information;--

Column 43, Line 46:
In Claim 18, please delete "date;" and insert --data;--

Column 46, Line 16:
In Claim 42, please delete "wireless," and insert --wireless device,--

Signed and Sealed this
Second Day of August, 2022

Katherine Kelly Vidal
*Director of the United States Patent and Trademark Office*